US007562217B2

(12) United States Patent
Kurose

(10) Patent No.: US 7,562,217 B2
(45) Date of Patent: Jul. 14, 2009

(54) WEB SERVICE PROVIDER AND AUTHENTICATION SERVICE PROVIDER

(75) Inventor: Hiroyasu Kurose, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 904 days.

(21) Appl. No.: 10/859,958

(22) Filed: Jun. 4, 2004

(65) Prior Publication Data

US 2005/0015585 A1   Jan. 20, 2005

(30) Foreign Application Priority Data

| Jun. 6, 2003 | (JP) | ............................. 2003-162592 |
| Jun. 6, 2003 | (JP) | ............................. 2003-162593 |
| May 31, 2004 | (JP) | ............................. 2004-162239 |
| May 31, 2004 | (JP) | ............................. 2004-162240 |

(51) Int. Cl.
*H04L 9/00* (2006.01)

(52) U.S. Cl. ....................... 713/168; 713/155; 713/152; 713/151

(58) Field of Classification Search ................. 713/168, 713/155, 152, 151
See application file for complete search history.

(56) References Cited

U.S. PATENT DOCUMENTS 5,119,490 A    6/1992    Kurose

OTHER PUBLICATIONS

Security Infrastructure of a Web Service based Resource Management System, Yan et al., year 2002.*
A Study of Security and Performance Issues in Designing Web-based Applications Yang, Shin-Jer; Chen, Jia-Shin; e-Business Engineering, 2007. ICEBE 2007. IEEE International Conference on Oct. 24-26, 2007 pp. 81-88.*
Secure Deniable Authenticated Key Establishment for Internet Protocols Meng-Hui Lim; SangGon Lee; Youngho Park; Sangjae Moon; Information Security and Assurance, 2008. ISA 2008. International Conference on Apr. 24-26, 2008 pp. 3-6.*
Security Analysis for Internet Banking Models; Dandash, O.; Phu Dung Le; Srinivasan, B.; Software Engineering, Artificial Intelligence, Networking, and Parallel/Distributed Computing, 2007. SNPD 2007. Eighth ACIS International Conference on vol. 3, Jul. 30, 2007-Aug. 1, 2007 pp. 1141-1146.*
Efficient Hierarchical Key Management Scheme for Access Control in the Mobile Agent Yu-Fang Chung; Tzer-Shyong Chen; Chia-Hui Liu; Tzu-Chi Wang; Advanced Information Networking and Applications—Workshops, 2008. AINAW 2008. 22nd International Conference on Mar. 25-28, 2008 pp. 650-655.*
U.S. Appl. No. 07/454,311, filed Dec. 26, 1989.
U.S. Appl. No. 07/423,083, filed Oct. 2, 1992.

(Continued)

*Primary Examiner*—David Y Jung
(74) *Attorney, Agent, or Firm*—Oblon, Spivak, McClelland, Maier & Neustadt, P.C.

(57) ABSTRACT

A Web service providing method of a Web service provider providing a Web service comprises a decoding request transmission step transmitting, in response to a request from a client, a decoding request of Web service use permission information related to permission of use of the Web service, to an authentication service provider that provides a service related to authentication, and a decode response reception step, receiving a decode response of the Web service use permission information issued in response to said decoding request of the Web service use permission information, from the authentication service provider.

17 Claims, 30 Drawing Sheets

OTHER PUBLICATIONS

U.S. Appl. No. 07/515,642, filed Apr. 25, 1990.
U.S. Appl. No. 07/150,431, filed Jan. 29, 1988.
U.S. Appl. No. 10/859,958, filed Jun. 4, 2004, Kurose.
ISBN4-7741-1313-1, (3.7 Kerberos, Authentication System for Open Networks, Edited by staff of $2^{nd}$ Editorial Section, Gijutsu Hyoron-sha, pp. 1-9, "Firewall & Network Security Practice Technique- The Strongest Security Guide for all the PC Unix Users and Managers", Nov. 2000.

* cited by examiner

FIG.8

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/"
    xmlns:xsi="http://www.w3.org/1999/XMLSchema-instance"
    xmlns:xsd="http://www.w3.org/1999/XMLSchema">
<SOAP-ENV:Body>
<tmns:authenticateByPassword
    xmlns:xs="http://www.w3.org/2001/XMLSchema" >
<providerName>WinNTKoi</providerName>
<domainName>koishikawa</domainName>
<authName>matsuno</authName>
<password>xxxxxx</password>
<duration>10</duration>
</tmns:authenticateByPassword>
</SOAP-ENV:Body>
</SOAP-ENV:Envelope>
```

FIG.9

```
<soapenv:Envelope
    xmlns:soapenv="http://schemas.xmlsoap.org/soap/envelope/"
    xmlns:xsd="http://www.w3.org/2001/XMLSchema"
    xmlns:xsi="http://www.w3.org/2001/XMLSchema-instance">
<soapenv:Body>
<ns1:authenticateByPasswordResponse
    soapenv:encodingStyle="http://schemas.xmlsoap.org/soap/encoding/" >
<return xsi:type="xsd:base64Binary">MF82ODBfLTc1MF8tNjkwXzEwNA==</return>
</ns1:authenticateByPasswordResponse>
</soapenv:Body>
</soapenv:Envelope>
```

FIG.10

| | |
|---|---|
| AUTH. TICKET ID | MF82ODBfLTc1MF8tNjkwXzEwNA== |
| PROVIDER NAME | WinNTKoi |
| VALID UNTIL | MARCH14, 3, 2003; 14:05:35 |
| USER INFORMATION | USER INFORMATION STRUCTURE |
| GROUP INFORMATION | GROUP INFORMATION STRUCTURE |
| PASSWORD | xxxxx |

FIG.11

| | |
|---|---|
| USER ID | C549AA1DABD5456a8382 |
| DOMAIN NAME | koishikawa |
| NAME | matsuno |

FIG.12

| | |
|---|---|
| GROUP ID | EDF7DC6DFE04da2A66E8 |
| DOMAIN NAME | koishikawa |
| NAME | rdhgroup |

FIG.14

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/" >
<SOAP-ENV:Body>
<tmns:createAuthTicket
    xmlns:xs="http://www.w3.org/2001/XMLSchema">
<masterAuthTicket>MF82ODBfLTc1MF8tNjkwXzEw NA==</masterAuthTicket>
<duration>30</duration>
<targets SOAP-ENC:arrayType="xs:string[1]">
<item>repositoryService</item>
</targets>
</tmns:createAuthTicket>
</SOAP-ENV:Body>
</SOAP-ENV:Envelope>
```

FIG.15

```
<soapenv:Envelope
    xmlns:soapenv="http://schemas.xmlsoap.org/soap/envelope/"
    xmlns:xsd="http://www.w3.org/2001/XMLSchema"
    xmlns:xsi="http://www.w3.org/2001/XMLSchema-instance">
<soapenv:Body>
<ns1:createAuthTicketResponse
    soapenv:encodingStyle="http://schemas.xmlsoap.org/soap/encoding/" >
<return xsi:type="xsd:base64Binary">MF84MzBfLTg2MF8tNDQwXy0xMDM=</return>
</ns1:createAuthTicketResponse>
</soapenv:Body>
</soapenv:Envelope>
```

| WEB SERVICE USE TICKET ID | MF84MzBfLTg2MF8tNDQwXy0xMDM= |
|---|---|
| AUTH. TICKET ID | MF82ODBfLTc1MF8tNjkwXzEwNA== |
| TARGET | repositoryService |
| VALID UNTIL | MARCH14, 3, 2003; 14:06:10 |

FIG.19

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/"
    xmlns:xsi="http://www.w3.org/1999/XMLSchema-instance"
    xmlns:xsd="http://www.w3.org/1999/XMLSchema">
<SOAP-ENV:Body >
<tmns:startSessionByAuthTicket
    xmlns:xs="http://www.w3.org/2001/XMLSchema" >
<authTicket> MF84MzBfLTg2MF8tNDQwXy0xMDM= </authTicket>
<uauthenticationUrl/>
<timeLimit>30</timeLimit>
<lockMode>s</lockMode>
</tmns:startSessionByAuthTicket>
</SOAP-ENV:Body>
</SOAP-ENV:Envelope>
```

FIG.20

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/"
    xmlns:xsi="http://www.w3.org/1999/XMLSchema-instance"
    xmlns:xsd="http://www.w3.org/1999/XMLSchema">
<SOAP-ENV:Body >
<tmns:startSessionByAuthTicket
    xmlns:xs="http://www.w3.org/2001/XMLSchema" >
<authTicket> MF84MzBfLTg2MF8tNDQwXy0xMDM= </authTicket>
<uauthenticationUrl>http://www.auth1.co.jp </uauthenticationUrl>
<timeLimit>30</timeLimit>
<lockMode>s</lockMode>
</tmns:startSessionByAuthTicket>
</SOAP-ENV:Body>
</SOAP-ENV:Envelope>
```

FIG.21

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/"
    xmlns:xsi="http://www.w3.org/1999/XMLSchema-instance"
    xmlns:xsd="http://www.w3.org/1999/XMLSchema">
<SOAP-ENV:Body>
<tmns:decodeAuthTicket
    xmlns:xs="http://www.w3.org/2001/XMLSchema" >
<authTicket>MF84MzBfLTg2MF8tNDQw Xy0xMDM=</authTicket>
<target>repositoryService</target>
</tmns:decodeAuthTicket>
</SOAP-ENV:Body>
</SOAP-ENV:Envelope>
```

FIG.22

```
<soapenv:Envelope
 xmlns:soapenv="http://schemas.xmlsoap.org/soap/envelope/"   xmlns:xsd="http://www.w3.org/2001/XMLSchema"
 xmlns:xsi="http://www.w3.org/2001/XMLSchema-instance">
<soapenv:Body>
<ns1:decodeAuthTicketResponse  soapenv:encodingStyle="http://schemas.xmlsoap.org/soap/encoding/"
>
<return xsi:type="xsd:string">OK</return>
<ticketInfo href="#id0" />
<directoryURL xsi:type="xsd:string">http://www.co.jp</directoryURL>
</ns1:decodeAuthTicketResponse>
<multiRef
 id="id0"
 soapenc:root="0"   soapenv:encodingStyle="http://schemas.xmlsoap.org/soap/encoding/"
 xsi:type="ns2:AuthTicketInfo" xmlns:soapenc="http://schemas.xmlsoap.org/soap/encoding/">
<authenticationURL xsi:type="xsd:string">http://www.auth1.co.jp</authenticationURL>
<targets xsi:type="soapenc:Array"
         soapenc:arrayType="xsd:string[1]" >
<item>repositoryService</item>
</targets>
<expireDate xsi:type="xsd:dateTime">2003-03-14T02:05:23.640Z</expireDate>
<ticketOptions xsi:type="soapenc:Array" soapenc:arrayType="ns5:Property[2]" >
<item href="#id1" />  <item href="#id2" />
</ticketOptions>
<userInfo href="#id3" />
<groupInfo xsi:type="soapenc:Array" soapenc:arrayType="ns2:Principal[1]" >
<item href="#id4" />
</groupInfo>
```

FIG.23

```
<soapenv:Envelope
    xmlns:soapenv="http://schemas.xmlsoap.org/soap/envelope/"
    xmlns:xsd="http://www.w3.org/2001/XMLSchema"
    xmlns:xsi="http://www.w3.org/2001/XMLSchema-instance">
<soapenv:Body>
<ns1:startSessionByAuthTicketResponse
    soapenv:encodingStyle="http://schemas.xmlsoap.org/soap/encoding/" >
<returnValue xsi:type="xsd:string">1047556404483-9575171-97-67-670-2576</returnValue>
</ns1:startSessionByAuthTicketResponse>
</soapenv:Body>
</soapenv:Envelope>
```

FIG.24

| SESSION ID | 1047556404483-9575171-97-67-670-2576 |
|---|---|
| WEB SERVICE USE TICKET ID | MF84MzBfLTg2MF8tNDQwXy0xMDM= |
| VALID UNTIL | MARCH 14, 2003; 14:06:10 |

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/" >
<SOAP-ENV:Body >
<tmns:getEntryList
    xmlns:xs="http://www.w3.org/2001/XMLSchema" >
<sessionId >1047556218267-97-104-92-1202254-6815-60-69</sessionId>
<folder>
<id/> <folderType>root</folderType>
</folder>
<offset>3</offset>
<count>1</count>
</tmns:getEntryList>
</SOAP-ENV:Body>
</SOAP-ENV:Envelope>
```

FIG.28

```
<soapenv:Envelope xmlns:soapenv="http://schemas.xmlsoap.org/soap/envelope/"
    xmlns:xsd="http://www.w3.org/2001/XMLSchema"
    xmlns:xsi="http://www.w3.org/2001/XMLSchema-instance">
  <soapenv:Body>
    <ns1:getEntryListResponse >
      <returnValue xsi:type="xsd:string">EOD</returnValue>
      <entries xsi:type="soapenc:Array" soapenc:arrayType="ns2:entry[1]" >
        <item>
          <id xsi:type="xsd:string"></id>
          <entryType xsi:type="xsd:string">group</entryType>
          <userSpace xsi:type="xsd:string">WinNT</userSpace>
          <domainName xsi:type="xsd:string">TEST</domainName>
          <name xsi:type="xsd:string">Domain Computers</name>
        </item>
      </entries>
      <totalCount xsi:type="xsd:int">1</totalCount>
    </ns1:getEntryListResponse>
  </soapenv:Body>
</soapenv:Envelope>
```

WEB SERVICE PROVIDER AND AUTHENTICATION SERVICE PROVIDER

BACKGROUND OF THE INVENTION

The present invention relates to Web service provider and authentication service provider.

Kerberos is an authentication system for open network (Reference should be made to Non-patent Reference 1).

Below, the concept of authentication by a third party organization in Kerberos will be explained with reference to FIG. 1 showing the concept of authentication by a third party organization.

Referring to FIG. 1, the fundamental framework of "authentication by a reliable third party organization" adopted with Kerberos includes the steps of: submitting a request to a KDC (Key Distribution Center), when a client wishes to use a service, for a ticket that permits the use of the service (step (1) of FIG. 1); get the ticket (step (2) of FIG. 1); and get the service by submitting the ticket received from the KDC for the service to the server (step (3) of FIG. 1).

However, such a model requires caching of the secret key in the side of the client, and there has been a problem of security in that the secret key may leak.

In order to attend to this problem, the concept of TGT (Ticket Granting Ticket) is proposed.

Hereinafter, the fundamental concept of safe authentication by a third party organization will be explained with reference to FIG. 2, wherein FIG. 2 is a diagram explaining the concept of safe authentication by a third party organization.

Referring to FIG. 2, the client requests for a TGT to an authentication server (Authentication Server) (step (1) of FIG. 2), and acquires the TGT from the authentication server (step (2) of FIG. 2). Next, the client submits the TGT to a TGS (Ticket Granting Server) (step (3) of FIG. 2), and acquires a ticket (server use permission ticket) permitting the use of a desired service (step (4) of FIG. 2). Finally, the client submits this ticket (server use permission ticket) for the intended service. Thereby, the use of the service becomes possible.

In this Kerberos system, the KDC plays the role of AS and also the role of TGS.

By adopting the method of authentication of FIG. 2, the Kerberos system can solve the aforementioned problems and can provide more secure authentication. (Non-patent Reference 1)

Gijutsu Hyoronsha, Editorial Section II, "Firewall & Network security, Practical Technique-all PCs, The strongest security guide for UNIX users and site managers, "Software Design Security Issue", Gijutsu Hyoron Publishing, 3.7 Kerberos, An Authentication System for Open Network, November 2000.

However, in the above conventional authentication method, there has been a need, when it is desired to add a new Web service that requires a use permission, to setup information (such as proof information, and the like) related to the above-mentioned Web service, in the KDC that provides the service of authentication.

In the case of providing plural Web services, therefore, the need of such additional setup noted above raises the problem of poor efficiency.

SUMMARY OF THE INVENTION

The present invention is made in view of the problems noted above and has its object of providing simple and efficient authentication service and/or Web service.

In order to solve the foregoing problems, the present invention provides a Web service providing method, comprising:

a decode request transmitting step transmitting, in response to a request from a client, a decode request to an authentication service provider providing a service of authentication, said decode request requesting decoding of Web service use permission information related to permission of the use of the Web service; and a decoded response receiving step receiving a decoded response of the Web service use permission information issued in response to the decode request from the authentication service provider.

As a result of the use of the Web service providing method thus comprising: a decode request transmitting step transmitting, in response to a request from a client, a decode request to an authentication service provider providing a service of authentication, said decode request requesting for decoding of Web service use permission information related to permission of use of a desired Web service; and a decoded response receiving step receiving a decoded response of said Web service use permission information issued in response to said decode request from said authentication service provider, it becomes possible to provide the authentication service and/or the Web service simply and efficiently.

Here, it should be noted that the "Web service use permission information" used herein corresponds to a Web service use ticket ID, or a Web service use ticket itself, or a part of the Web service use ticket, as will be described later. Also, the "session" used herein corresponds a session ID or the session itself, or a part of the session, as will be described later.

Further, the present invention provides a Web service proving program, a recording medium storing the Web service providing program and a Web service providing apparatus for solving the foregoing problems.

Further, the present invention provides an authentication service providing method for providing a service regarding authentication, comprising:

a Web service use permission information creating step creating, in response to a request from a client, Web service use permission information related to a use permission of a Web service; and a decoding step decoding, in response to a request from a Web service provider providing said Web service, corresponding Web service use permission information.

As a result of the use of the authentication service providing method for providing a service regarding authentication thus comprising: a Web service use permit information creating step creating, in response to a request from a client, Web service use permission information related to a use permission of a desired Web service; and a decoding step decoding, in response to a request from a Web service provider providing said Web service, corresponding Web service use permission information, it becomes possible to provide authentication service and/or Web service simply and efficiently.

Here again, it should be noted that the "Web service use permission information" corresponds to a Web service use ticket ID, or the Web service use ticket itself, or a part of the Web service use ticket, as will be described later. Also, the "user authentication information" used herein corresponds the authentication ticket ID or the authentication ticket itself, or a part of the authentication ticket, as will be described later.

Further, the present invention provides an authentication service proving program, a recording medium storing the authentication service providing program and a Web service providing apparatus for solving the foregoing problems.

BRIEF DESCRIPTION OF THE DRAWINGS

FIG. 8 is a diagram for explaining an example of an authentication ticket acquisition request;

FIG. 9 is a diagram for explaining an example of an authentication ticket acquisition response;

FIG. 10 is a diagram showing an example of an internal structure of an authentication ticket;

FIG. 11 is a diagram explaining an example of a user information structure;

FIG. 12 is a diagram explaining an example of a group information structure;

FIG. 14 is a diagram explaining an example of a Web service use ticket acquisition request;

FIG. 15 is a diagram explaining an example of a Web service use ticket acquisition response;

FIG. 16 is a diagram for explaining an example of an internal structure of a Web service use ticket;

FIG. 19 is a diagram explaining an example of a session start request;

FIG. 20 is a diagram explaining another example of the session start request;

FIG. 21 is a diagram explaining an example of Web service use ticket decoding request;

FIG. 22 is a diagram explaining an example of a Web service use ticket decoding response;

FIG. 23 is a diagram explaining an example of a session start response;

FIG. 24 is a diagram explaining an example of an internal structure of the session;

FIG. 27 is a diagram explaining an example of a directory service use request;

FIG. 28 is a diagram explaining an example of a directory service use response;

DETAILED DESCRIPTION OF THE INVENTION

Hereinafter, embodiments of the present invention will be explained with reference to the drawings.

EMBODIMENT 1

Figure 1:
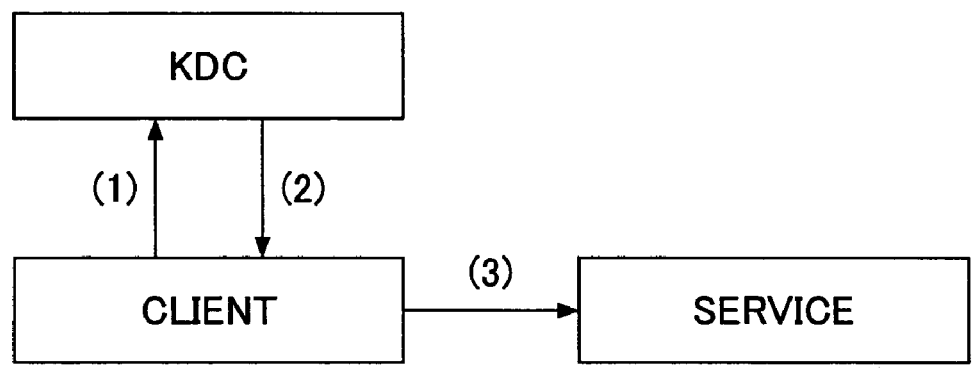
FIG. 1 is a diagram explaining the concept of authentication by a third party organization.
Figure 2:
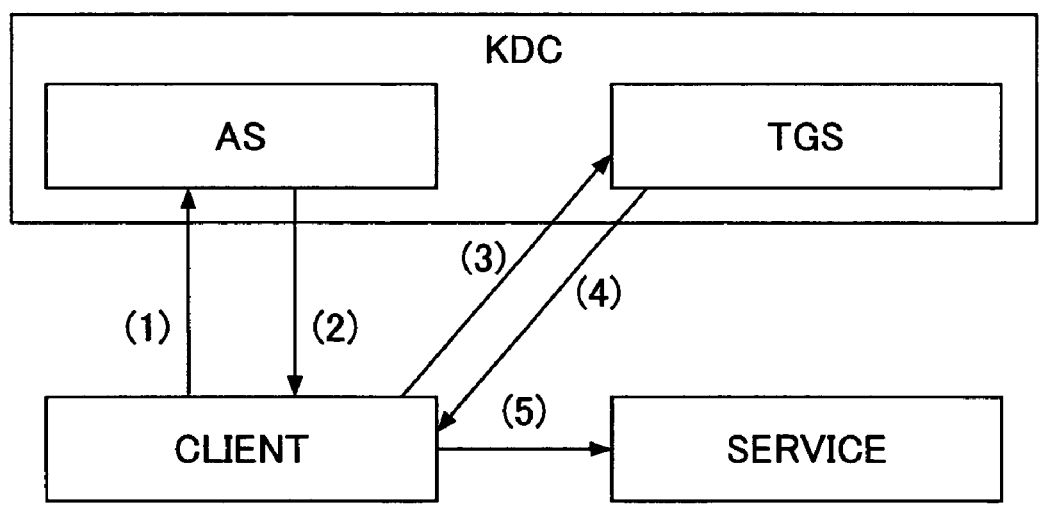
FIG. 2 is a diagram for explaining the concept of safe authentication by a third party organization.
Figure 3:
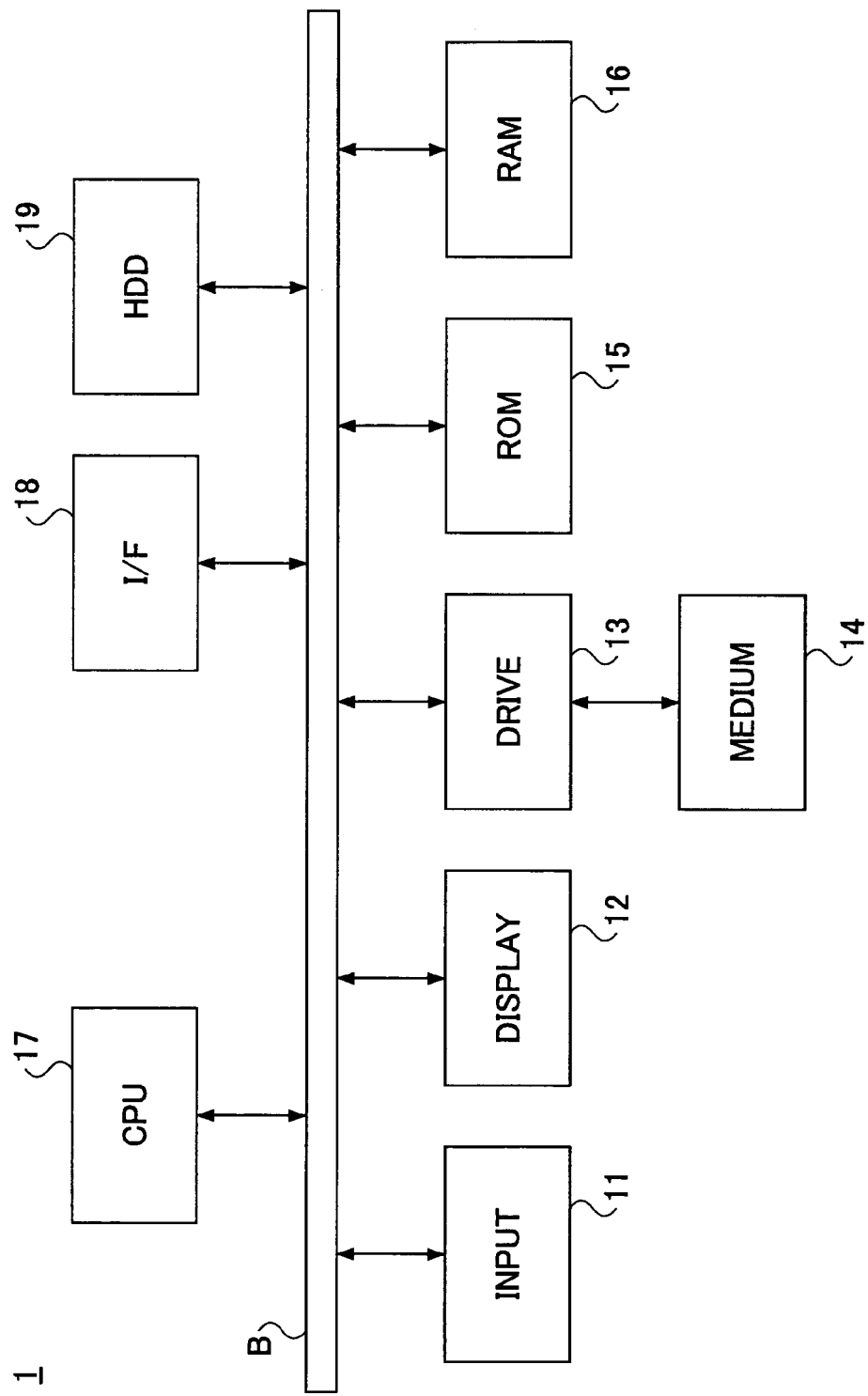
FIG. 3 is a diagram showing the hardware construction of an authentication service providing server.

FIG. 3 shows the hardware construction of an authentication service providing server 1.

Referring to FIG. 3, the hardware construction of the authentication service providing server 1 includes an input device 11, a display device 12, an drive apparatus 13, a ROM (Read Only Memory) 15, a RAM (Random Access Memory) 16, a CPU (Central Processing Unit) 17, an interface apparatus 18, and an HDD (Hard Disk Drive) 19, wherein the devices 11-19 are connected to a bus B.

The input device 11 is formed of keyboard, mouse, and the like, operated by the user of the authentication service providing server 1 and is used to input various operational signals to the authentication service providing server 1.

The display device 12 is formed a display, and the like, used by the user of the authentication service providing server 1 and is used to display various information.

The interface apparatus 18 is the interface that connects the authentication service providing server 1 to a network, and the like.

Application programs corresponding to the authentication service 30 to be described later and a main program that controls the overall processing of the authentication service providing server 1 are provided to the authentication service provider server 1 by a recording medium 14 such as a CD-ROM, and the like, or downloaded through a network. Thereby, the recording medium 14 is set to the drive apparatus 13, and the foregoing application programs or the main programs, and the like, are installed to the HDD 19 from the recording medium 14 via the drive apparatus 13.

It should be noted that the ROM 15 stores data, and the like, while the RAM 16 reads out the foregoing application programs or the main program, and the like, from the HDD 19 at the time of activation of the authentication service providing server 1 and holds the same therein. Thereby, the CPU 17 reads the RAM 16 and carries out processing in accordance with the above-mentioned application programs or main program, and the like thus held in the RAM 16.

Further, the HDD 19 stores therein an authentication ticket 50, a Web service use ticket 60, user information, group information, and the like, to be described later, in addition to the programs.

Hereinafter, the hardware construction of a Web service providing server 2 will be explained with reference to FIG. 4.

Figure 4:
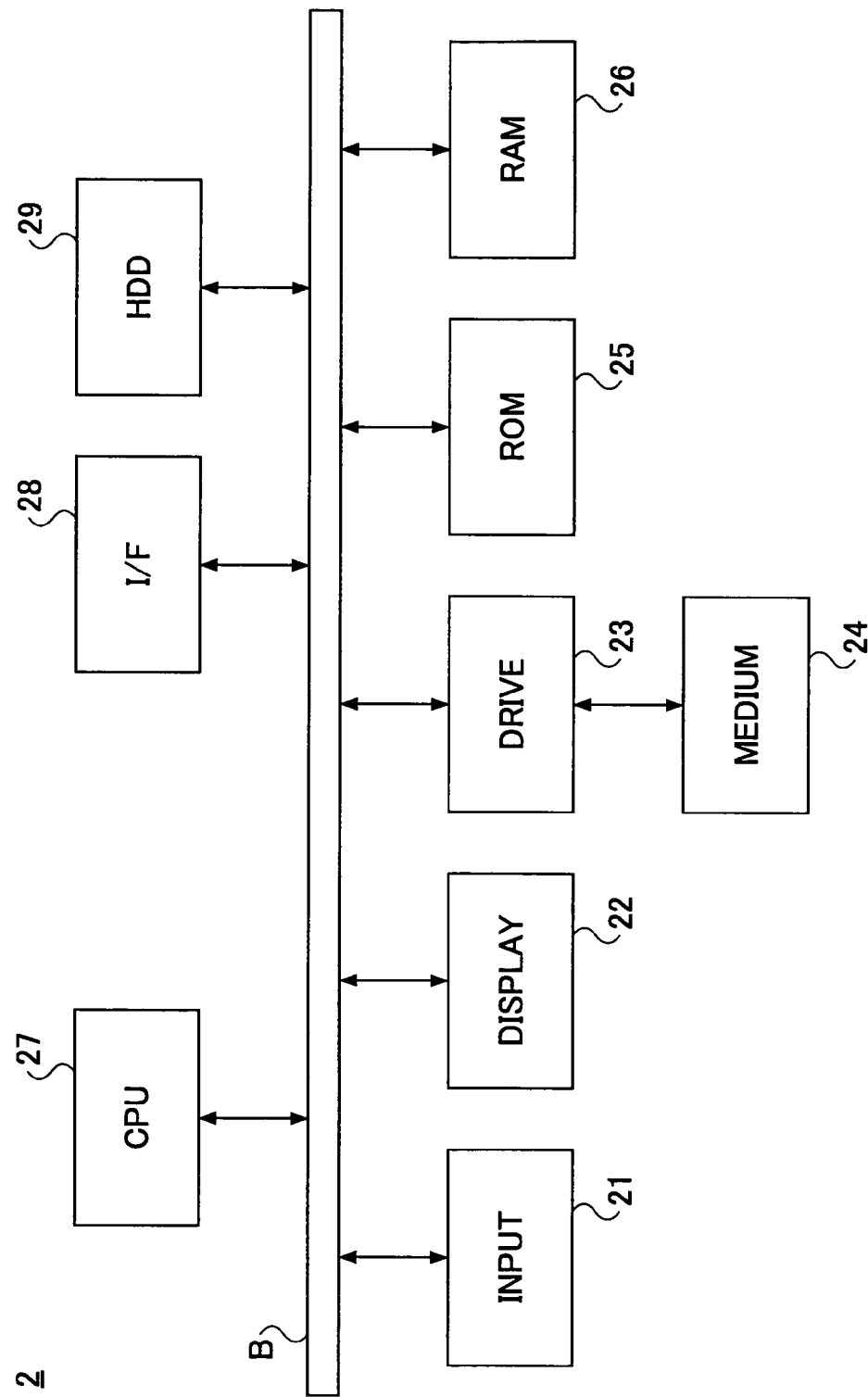
FIG. 4 is a diagram showing the hardware construction of a Web service providing server.

FIG. 4 is the hardware construction diagram of the Web service providing server 2.

Referring to FIG. 4, the Hardware construction of the Web service providing server 2 includes an input device 21, a display device 22, a drive apparatus 23, a ROM (Read Only Memory) 25, a RAM (Random Access Memory) 26, a CPU (Central Processing Unit) 27, an interface apparatus 28, and an HDD (Hard Disk Drive) 29, wherein the devices 21-29 are connected to a common bus B.

Here, it should be noted that the input device 21 is formed of a keyboard, a mouse, and the like, operated by the user of the Web service providing server 2 and is used to input various operational signals to the Web service providing server 2.

The display device 22 is formed of a display, and the like, used by the user of the Web service providing server 2 and displays various information.

The interface apparatus 28 is an interface connecting the Web service providing server 2 to the network, and the like.

Here, it should be noted that application programs corresponding to a directory service 40 to be described later or a main program, and the like, used for controlling the overall processing of the Web service providing server 2, are provided to the Web service providing server 2 by a recording medium 24 such as a CD-ROM, or downloaded via the network. Thereby, the recording medium 24 is set to the drive apparatus 23, and the application programs or main program, and the like, are installed to the HDD 29 from the recording medium 24 through the drive apparatus 23.

It should be noted that the ROM 25 stores data, and the like, while the RAM 26 reads out the application programs or the main program, and the like, from the HDD 29 at the time of activation of the Web service providing server 2 and holds the same therein. Further, the CPU 27 reads the RAM 26 and executes the processing in accordance with the application programs, the main program, and the like, thus held in the RAM 26.

Further, the HDD 29 is used to store, in addition to the programs, the URL of the authentication service 30 that provides the services related to authentication, or the character sets such as "repository Service", and the like, used for distinguishing the directory service 40. The URL of the authentication service 30 becomes necessary when using a session 70 and/or a directory service 40 as will be described later, while the character set becomes necessary when using the directory service 40.

As described previously, the present embodiment will be described based on the assumption that: the authentication service 30 to be described later is implemented in the authentication service providing server 1 in the embodiment of the present invention; and that the directory service 40 to be described later is implemented in the Web service providing server 2. On the other hand, the authentication service 30 and the directory service 40 may be implemented in the same server, and the like.

Hereinafter, examples of authentication service providing method and/or Web service providing method of the present invention will be described with reference to FIG. 5.

Figure 5:
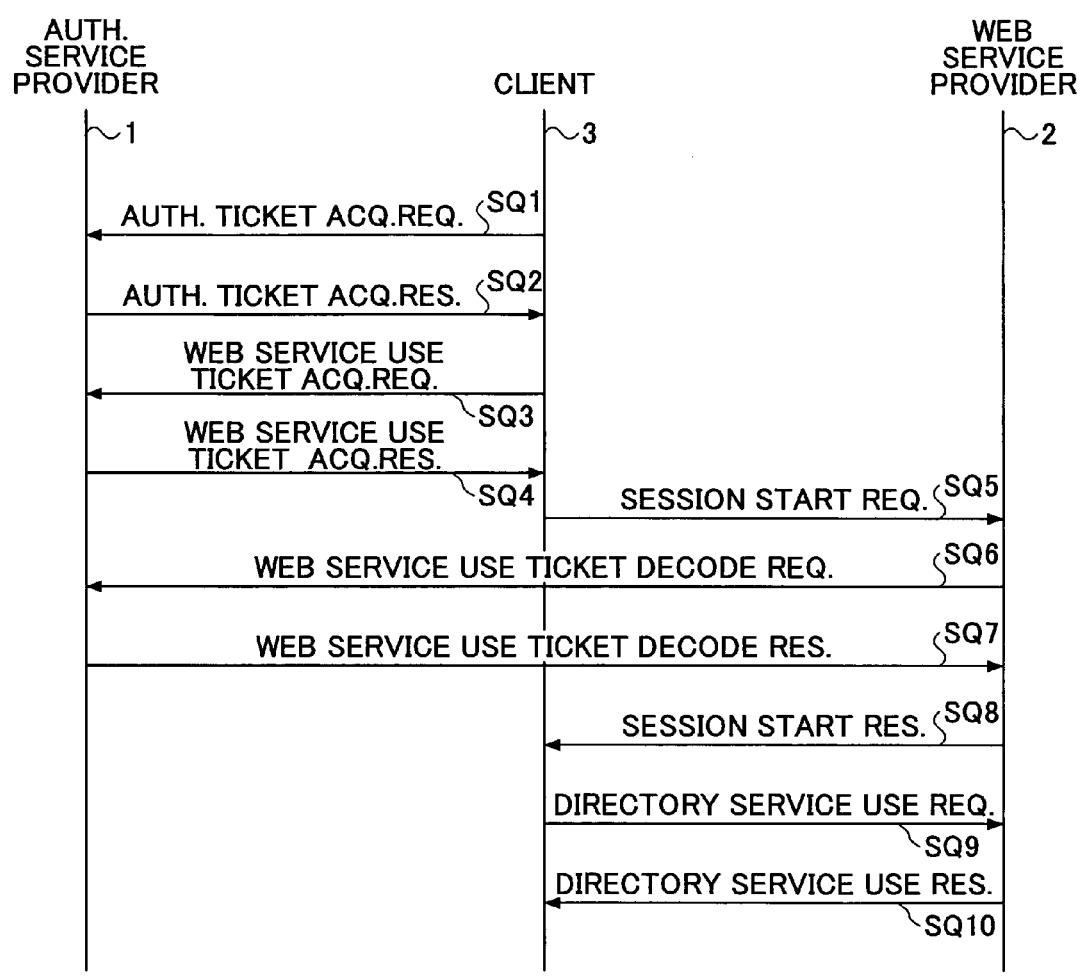
FIG. 5 is a first sequence diagram for explaining an authentication service providing method and/or Web service providing method.

FIG. 5 is a first sequence diagram explaining the authentication service providing method and/or Web service providing method of the present invention.

Referring to FIG. 5, a client 3 that wishes to use a Web service provided by the Web service providing server 2 creates an acquisition request for an authentication ticket 50, which is a ticket that authenticates the user of the client 3, and transmits the same to an authentication service 30 (Sequence SQ1 of FIG. 5).

Details of the authentication ticket acquisition request will be described later by using FIG. 8.

The authentication service 30 carries out authentication on the basis of the user name, password, and the like, included in the authentication ticket acquisition request from the client 3 and creates an authentication ticket 50. Further, the authentication server 30 creates an authentication ticket acquisition response including an ID (authentication ticket ID) of the authentication ticket 50 and transmits the same to the client 3 (Sequence SQ2 of FIG. 5).

Details of the authentication ticket acquisition response will be described later by using FIG. 9.

Upon reception of the authentication ticket acquisition response, the client 3 transmits an acquisition request for a Web service use ticket 60, which includes the authentication ticket ID and permits the use of the Web service (for example, the use of the directory service 40) provided by the Web service providing server 2, to the authentication service 30 (sequence SQ3 of FIG. 5).

Details of the Web service use ticket acquisition request will be described later with reference to FIG. 14. For example, the client 3 adds distinction information and the like requested by the Web service to be used (such as the directory service 40) for distinguishing that Web service in the Web service use ticket acquisition request, and transmits the same to the authentication service 30.

The authentication service 30 determines, on the basis of the authentication ticket ID included in the Web service use ticket acquisition request, whether or not there exists a valid authentication ticket 50 corresponding to the authentication ticket ID, and if it is judged that there exists such a valid authentication ticket 50 in correspondence to the authentication ticket ID, the authentication service 30 creates the Web service use ticket 60 corresponding to the Web service use ticket acquisition request. Further, the authentication service 30 creates a Web service use ticket acquisition response containing the ID (Web service use ticket ID) of the Web service use ticket 60 and transmits the same to the client 3 (sequence SQ4 of FIG. 5).

For example, in the case the distinction information that distinguishes the Web services is included in the Web service use ticket acquisition request, the authentication service 30 creates the Web service use ticket 60 including the distinction information that distinguishes that Web service and creates a Web service use ticket acquisition response that contains the ID (Web service use ticket ID) of the Web service use ticket 60. Further, the authentication service 30 transmits the same to the client 3.

Details of the Web service use ticket acquisition response will be described later by using FIG. 15. Here, it should be noted that the client 3 can transmit the Web service use ticket acquisition request containing the authentication ticket ID to the authentication service 30 during the interval in which the authentication ticket 50 is valid, by using the authentication ticket ID contained in the authentication ticket acquisition response received in the sequence SQ2. The authentication service 30 judges, based on the authentication ticket ID contained in the Web service ticket acquisition request, whether or not there exists a corresponding valid authentication ticket 50, and if it is judged that there exists such a valid thicket 50, the authentication service 30 creates a Web service use ticket 60 corresponding to the Web service use ticket acquisition request. Further, the authentication service 30 creases a Web service use ticket acquisition response containing the Web service use ticket ID and transmits the same to the client.

Thus, once the authentication is achieved, the client can acquire the Web service use ticket 60 (or Web service use ticket ID) corresponding to the Web service to be used, without carrying out the authentication process each time, by repeatedly using the authentication ticket 50 for the interval in which the authentication is valid.

When the Web service use ticket acquisition response is received, the client 3 transmits a start request of the session with the directory service 40 containing the Web service use ticket ID and transmits the same to the directory service 40 (sequence SQ5 of FIG. 5).

Details of the session start request will be described later by using FIG. 19 and/or FIG. 20.

The directory service 40 creates the decoding request of the Web service use ticket 60 that contains the distinction information for identifying that Web service use ticket ID and that directory service 40 on the basis of the Web service use ticket ID contained in the session start request, and transmits the same to the authentication service 30 (sequence SQ6 of FIG. 5).

Details of the Web service use ticket decoding request will be described later by using FIG. 21.

The authentication service 30 determines whether or not it is a valid Web service use ticket 60 on the basis of the distinction information that distinguishes the Web service use ticket ID and/or directory service 40 contained in the Web service use ticket decoding request, and creates a Web service use ticket decoding response containing the result of the judgment (result of decoding) or the content of the authentication ticket 50 and/or the Web service use ticket 60. Further, the authentication service 30 transmits the same to the directory service 40 (sequence SQ7 of FIG. 5).

Details of the Web service use ticket decoding response will be described later by using FIG. 22.

The directory service 40 creates a session 70 on the basis of the result of the above-mentioned determination contained in the Web service use ticket decoding response and transmits the session start response including the ID of the session 70 to the client 3 (sequence SQ8 of FIG. 5).

Details of the session start response will be described later by using FIG. 23.

Upon reception of the session start response, the client 3 creates the use request of the directory service 40 including the session ID and transmits the same to the directory service 40 (sequence SQ9 of FIG. 5).

Details of the directory service use request will be described later by using FIG. 27.

The directory service 40 determines, on the basis of the session ID included in the directory service use request, whether or not it is a valid ID, and, when it is determined that it is a valid session ID, carries out the processing according to the directory service use request. Further, the directory service 40 creates a directory service use response corresponding to that directory service use request and transmits the same to the client 3 (sequence SQ10 of FIG. 5).

Details of the directory service use response will be described later by using FIG. 28.

As shown in the sequence SQ6 of FIG. 5, the Web service (for example, directory service 40), inquires to the authentication service 30, in the authentication service providing method and/or Web service providing method of the present invention, whether or not the Web service use ticket ID included in the request from the client 3 is a valid Web service use ticket ID.

Also, as shown in the sequence SQ7 of FIG. 5, the authentication service 30 that has received the inquiry determines whether or not the Web service use ticket ID is a valid Web service use ticket ID, and returns the result to the requesting Web service (for example, directory service 40).

By using such authentication method, the authentication service 30 can provide the authentication service and/or Web service also in the case a new Web service is added to the Web service providing server 2, by managing the authentication ticket 50 and/or the Web service use ticket 60, without providing new setting, and the like, in the authentication service 30.

Figure 6:
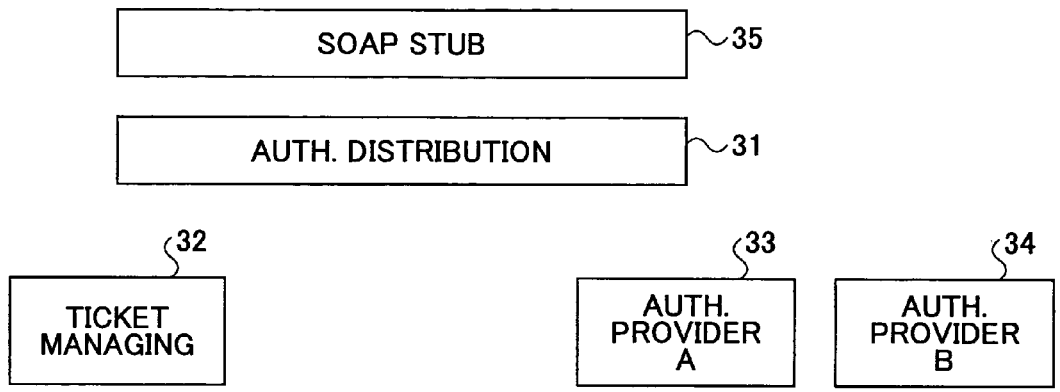
FIG. 6 is a function diagram showing an example of authentication service.

Hereinafter, the function and construction of an exemplary authentication service 30 will be explained by using FIG. 6 showing the functional diagram of the exemplary authentication service.

As shown in FIG. 6, the authentication service 30 includes an authentication distribution part 31, a ticket administration part 32, an authentication provider A33, an authentication provider B34, and a SOAP (Simple Object Access Protocol) stub 35.

Here, it should be noted that the SOAP stub 35 is a module for realizing communication by SOAP between the client 3 and/or Web service providing server 2.

Further, the authentication distribution part 31 is the module that provides a common interface for various kinds of authentication providers to the client 3 and/or the Web service providing server 2. For example, the authentication distribution part 31 calls the authentication provider that carries out the authentication according to the provider name.

The authentication provider A33, the authentication provider B34, and the like, are the module called "authentication provider". Here, it should be noted that the authentication provider functions as an adapter or mediator for incorporating various authentication engines into the authentication service 30. Here, it should be noted that an authentication engine means the system that carries out the actual authentication processing such as password comparison.

Thus, individual authentication engine has its own interface (protocol). On the other hand, in order to provide the authentication function of each of the authentication engines to the client 3 as the Web service, it is necessary to comply with the interface prescribed with regard to the authentication distribution part 31. The authentication provider absorbs the original protocols of the individual authentication engines and provides a common interface to the authentication distribution part 31. Thus, in order to incorporate a new authentication engine into the authentication service 30, a new authentication provider is implemented. However, the authentication provider itself may have the function of authentication engine.

The ticket managing part 32 is the module that manages the tickets related to authentication. For example, the ticket managing part 32 manages an authentication ticket 50, user information, group information, a Web service use ticket 60, and the like.

Although the functional construction of the authentication service 30 has been explained in FIG. 6 for the example having plural authentication providers, it is not necessarily that there exist plural authentication providers, and the authentication service 30 may have only the authentication provider A33. In the case of such a construction, the authentication distribution part 31 is not necessarily be included in the construction of the authentication service 30.

For the sake of simplicity of explanation, following explanation is made for the case in which the authentication service 30 has plural authentication providers as shown in FIG. 6 and that the authentication distribution part 31 is also included in the authentication service 30. This, however, does not limit the implementation of the present invention.

Hereinafter, the functional construction of an exemplary directory service 40 will be explained by using FIG. 7.

Figure 7:
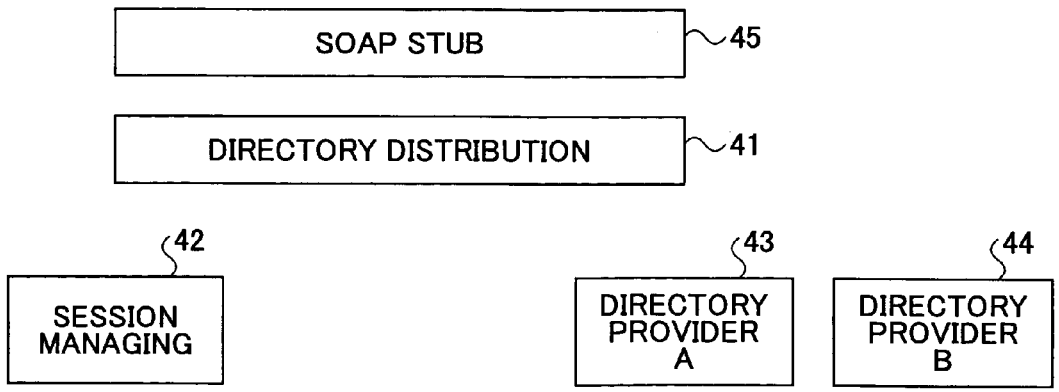
FIG. 7 is a functional diagram showing an example of a directory service.

FIG. 7 is a diagram showing the functional construction of the exemplar directory service.

As shown in FIG. 7, the directory service 40 includes a directory distribution part 41, a directory distribution part 41, a session managing part 42, a directory provider A43, a directory provider B44, and an SOAP stub 45.

It should be noted that the SOAP stub 45 is a module for realizing communication between the client 3 and/or authentication service provider server by SOAP.

The directory distribution part 41 is a module providing a common interface to various directory providers to the client 3 and/or the authentication service providing server 1.

The directory provider A43, the directory provider B44, and the like, are the module called "directory provider". Here, it should be noted that the directory provider functions as an adapter or mediator for incorporating various directory engines into the directory service 40. Furthermore, it should be noted that the directory engine means the system that provides management of user information or group information regarding the directory, and the like, and/or providing of such information.

It should be noted that each directory engine has its own original interface (protocol). On the other hand, in order to provide the function of each directory engine to the client 3 as the Web service, there is a need to comply with the interface prescribed with regard to the directory distribution part 41.

It is the directory provider that absorbs the difference between the original protocols of the individual directory engines and provides a common interface to the directory distribution part 41. Accordingly, in order to incorporate a new directory engine into the directory service 40, a new directory provider has to be implemented. On the other hand, the directory provider itself may have the function of the directory engine.

The session managing part 42 is the module that manages the session 70.

In FIG. 7, the functional construction of the directory provider 40 has been explained for the example that has plural directory providers. However, it is not necessary that the directory provider 40 has plural directory providers and may have the construction that has only the directory provider A43. In the case of such a construction, the directory distribution part 41 is not necessarily included in the construction of directory service 40.

However, for the sake of simplification of the explanation, following explanation will be made on the assumption that the directory service 40 has plural directory providers as shown in FIG. 7 and the directory distribution part 41 is included in the directory service 40. This, however, does not restrict the implementation of the present invention.

Hereinafter, an example of the authentication ticket acquisition request will be explained by using FIG. 8.

FIG. 8 is a diagram for explaining an example of the authentication ticket acquisition request.

As shown in FIG. 8, the tag <ProviderName></ProviderName> of the authentication ticket acquisition request includes the provider name that distinguishes the authentication provider as a parameter.

Also, the tag <DomainName></DomainName> includes the domain name as the parameter.

Further, the tag <AuthName></AuthName> includes the user name as a parameter.

Further, the tag <Password></Password> includes a password as a parameter.

Further, the tag <Duration></Duration> includes the effective time of the authentication ticket 50 as a parameter in terms of seconds.

For example, the SOAP stub 35 that has received the authentication ticket acquisition request shown in FIG. 8 calls authenticateByPassword, which is the method that the authentication service 30 provides, while using the foregoing parameters as an argument.

Then the authentication distribution part 31 provides the above-mentioned domain name, user name, password etc, to the corresponding authentication provider (such as authentication provider A33) based on the provider name, and requests authentication.

The authentication provider A33 that has received the request of the authentication transmits the authentication request of the user including the domain name, user name, password etc., to an authentication server such as an external authentication server.

For example, the authentication provider A33 that has received the result of authentication indicating that the user is a valid user together with the group information to which that user belongs from the foregoing external authentication server, and the like, provides the received information, the password, the effective time of the authentication ticket 50, and the like, to the ticket administration part 32 and requests creation of the authentication ticket 50.

The ticket managing part 32 that has received the above-mentioned request creates the authentication ticket 50 shown in FIG. 10 to be described later and provides the authentication ticket ID, which is the distinction information distinguishing the authentication ticket 50, to the authentication provider A33 as the authentication ticket 50.

The authentication provider A33 provides the above-mentioned authentication ticket ID to the authentication distribution part 31.

The authentication distribution part 31 calls authenticateByPasswordResponse, which is a method that the authentication service 30 provides, while using the authentication ticket ID, and the like, as the argument.

Then, the SOAP stub 35 creates the authentication ticket acquisition response as shown in FIG. 9 that contains the above-mentioned authentication ticket ID as will be described later and transmits the same to the client 3.

Hereinafter, an example of the authentication ticket acquisition response will be explained by using FIG. 9.

FIG. 9 is a diagram for explaining the example of the authentication ticket acquisition response.

As shown in FIG. 9, the tag <Return xsi: type='xsd:' base64Binary></Return> of the authentication ticket acquisition response contains the above-mentioned authentication ticket ID.

The client 3 that has acquired the foregoing authentication ticket ID creates the acquisition request of the Web service use ticket 60 that includes the authentication ticket ID and transmits the same to the authentication service 30 as will be described later.

Hereinafter, the internal structure of an exemplary authentication ticket 50 will be explained by using FIG. 10.

FIG. 10 is a diagram for explaining an example of the internal structure of an authentication ticket.

As shown in FIG. 10, the authentication ticket 50 contains authentication ticket ID, provider name, term of validity, user information, group information, and password.

It should be noted that the authentication ticket ID holds the distinction information for distinguishing the authentication ticket 50. The provider name holds the name of the authentication provider that has made the authentication. The term of validity holds the term of validity of the authentication ticket 50 provided from the authentication provider that has made the authentication. Further, the user information holds the structure of the user information of the user provided from the authentication provider in the form as it is. The group information stores the arrangement of the pointer pointing to the structure of the group information of the group to which the user belongs and provided from the authentication provider that has made the authentication. The password holds the password provided from the authentication provider that has made the authentication.

Hereinafter, an example of the user information structure will be explained by using FIG. 11.

FIG. 11 is a diagram for explaining an example of the user information structure.

As shown in FIG. 11, the user information structure contains the user ID, the domain name, and the name.

The user ID holds the distinction information for distinguishing the user. The domain name holds the domain name corresponding to the above-mentioned user. The name holds the name of the above-mentioned user.

Further, the user information structure may further include last name, name, nickname, display name, reading of the name, employee number, address, phone number, mail address, executive title, assigned organization, additional post information, accounting code, assigned group, manager authority, and the like.

Hereinafter, an example of the group information structure will be explained by using FIG. 12.

FIG. 12 is such a diagram for explaining the example of the group information structure.

As shown in FIG. 12, the group information structure contains the group ID, the domain name, and the name.

The group ID holds the distinction information for distinguishing the group to which the user belongs. The domain name holds the domain name corresponding to the group. Further, the name holds the name of the group.

Furthermore, the group information structure may include group name, group explanation, upper class group, lower class group, group members, group code, accounting code, and the like.

Hereinafter, an example of authentication ticket creation processing will be explained by using FIG. 13.

Figure 13:
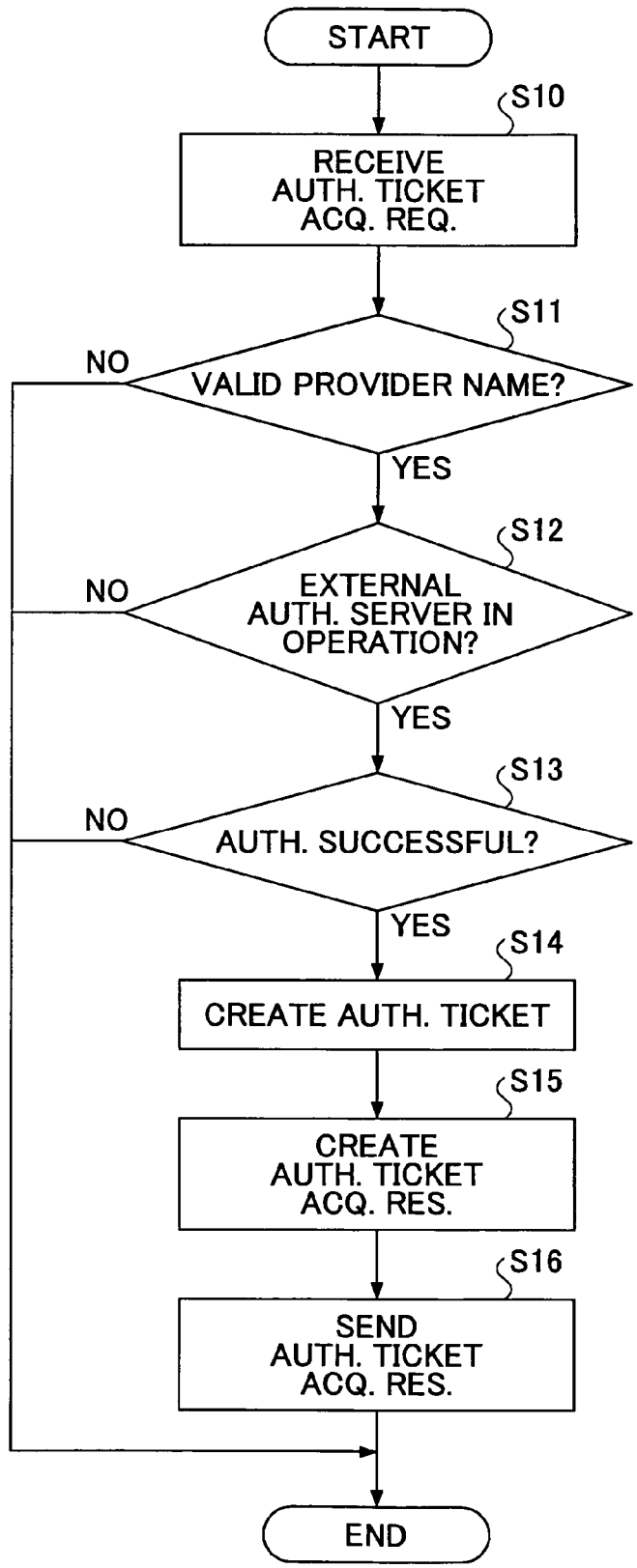
FIG. 13 is a flowchart explaining an example of an authentication ticket creation processing.

FIG. 13 is a flowchart explaining an example of the authentication ticket creation processing.

In step S10, the SOAP stub 35 receives an authentication ticket acquisition request shown in FIG. 8 from the client 3. As noted previously, the SOAP stub 35 that has received the authentication ticket acquisition request calls authenticateByPassword, which is a method provided by the authentication service 30, while using each parameter included in the authentication ticket acquisition request as the argument.

After the step S10, the process proceeds to the step S11, and the authentication distribution part 31 determines whether or not the provider name is a valid provider name on the basis of the provider name, which is one of the above-mentioned parameters.

When it is determined that the provider name is a valid provider name (YES in step S11), the authentication distribution part 31 provides the parameters such as the domain name, user name, password, and the like, to a corresponding authentication provider (for example, the authentication provider A33), and requests the authentication.

On the other hand, when it is determined that the provider name is not a valid provider name (NO in step S11), the authentication distribution part 31 terminates the processing.

For example, the authentication distribution part 31 holds and manages the name of the authentication provider and determines, based on the comparison of the provider name included in the parameter and the name of the authentication providers under possession and management, whether or not there exists a valid provider name that corresponds the given provider name.

In the step S12, the authentication provider A33 that has received the request for the above-mentioned authentication determines, when requesting the authentication of the user to an external authentication server, and the like, whether or not the external authentication server is in operation.

When it is determined that the corresponding external authentication server is in operation (YES in step S12), the authentication provider A33 transmits an authentication request of the user including the domain name, user name, password etc., to the foregoing external authentication server.

On the other hand, when it is determined that the corresponding external authentication server is in operation (NO in step S12), the authentication provider A33 terminates the processing.

For example, the authentication provider A33 strikes a ping (Packet. Internet Groper) to the corresponding external authentication server and determines whether or not the external authentication server is in operation.

In the step S13, the authentication provider A33 determines whether or not the authentication has been successful.

When it has been determined that the authentication has been successful (YES in step S13), the authentication provider A33 provides the group information of the group to which the above-mentioned user belongs, the information of the user contained in the above-mentioned authentication ticket acquisition request, the effective time of the password and the authentication ticket 50, and the like, received from the external authentication server, and the like, to the ticket managing part 32 and requests creation of the authentication ticket 50.

On the other hand, when it has been determined that the authentication has failed (NO in step S13), the authentication provider A33 terminates the processing.

For example, the authentication provider A33 determines that the authentication has been successful when it receives the authentication result indicating success of the authentication and the group information of the group to which the user belongs, and the like.

In the step S14, the ticket managing part 32 thus received the creation request of the authentication ticket 50 crates the authentication ticket 50 shown in FIG. 10 and provides the authentication ticket ID, which is the distinction information for distinguishing the authentication ticket 50 to the authentication provider A33 as the authentication ticket 50.

After the step S14, the process proceeds to the step S15 the authentication distribution part 31 that has been provided with the above-mentioned authentication ticket ID from the authentication provider A33 calls authenticateByPasswordResponse, which is the method that the authentication service 30 provides, while using the above-mentioned authentication ticket ID, and the like, as the argument. Then SOAP stub 35 creates the authentication ticket acquisition response containing the above-mentioned authentication ticket ID shown in FIG. 9 based on the request from the authentication distribution part 31.

After the step S15, the process proceeds to the step S16, and the SOAP stub 35 transmits the authentication ticket acquisition response created in step S15 to the client 3.

Meanwhile, in the case of not using an external authentication server, and the like, and the authentication provider A33 itself functions as an authentication engine, it is possible to omit the processing shown in the step S12 and use the authentication provider A33 itself to carry out the authentication and the processing of the step S13 for determining whether or not the authentication has been successful.

Hereinafter, an example of the Web service use ticket acquisition request will be explained by using FIG. 14.

FIG. 14 is a diagram for explaining an example of the Web service use ticket acquisition request.

As shown in FIG. 14. the tag <MasterAuthTicket></masterAuthTicket> of the Web service use ticket acquisition request includes the authentication ticket ID as a parameter.

Further, the tag <Duration></duration> includes the term of validity of the Web service use ticket 60 as a parameter in terms of seconds.

Also, the tag <item></item> includes the character sets (hereinafter designated simply as target) for distinguishing the Web service that the client request for the use thereof (such as directory service 40) as a parameter.

For example, the SOAP stub 35 that has received the Web service use ticket acquisition request shown in FIG. 14 calls createAuthTicket, which is a method that the authentication service 30 provides, while using each parameter as an argument.

Then the authentication distribution part 31 determines whether or not there exists a valid authentication ticket 50 corresponding to that authentication ticket ID on the basis of the above-mentioned authentication ticket ID.

When it is determined that there exists a valid authentication ticket 50 corresponding to the above-mentioned authentication ticket ID in the ticket administration part 32, the authentication distribution part 31 acquires the provider name, and the like, included in the authentication ticket 50 corresponding to the above-mentioned authentication ticket ID from the ticket management part 32 and provides the authentication ticket ID, the effective time of the above-mentioned Web service use ticket 60, the target, and the like, to the authentication provider (for example, the authentication provider A33) corresponding to the above-mentioned provider name.

The authentication provider A33 provides the authentication ticket ID, the term of validity of the Web service use ticket 60, the target, and the like, to the ticket management part 32 and requests creation of the Web service use ticket 60.

The ticket managing part 32 that has received the foregoing request creates the Web service use ticket 60 shown in FIG. 16 to be described later and provides the Web service use ticket ID, which is the distinction information that distinguishes the Web service use ticket 60, to the authentication provider A33 as the Web service use ticket 60.

In the case the tag <item></item> of the Web service use ticket acquisition request shown in FIG. 14 contains nothing, the ticket managing part 32 may create a Web service use ticket 60 not having anything in the target of FIG. 16 to be described later and thus can use any Web service, and provides the Web service use ticket ID, which is the distinction information that distinguishes that Web service use ticket 60, to the authentication provider A33 as the Web service use ticket 60.

In the explanation hereinafter, it is assumed for the sake of simplicity that the tag <item></item> of the Web service use ticket acquisition request includes the distinction information (for example, the character set such as repositoryservice) distinguishing the Web service (for example, directory service 40) that the client requests the use thereof.

The authentication provider A33 provides the above-mentioned Web service use ticket ID to the authentication distribution part 31.

The authentication distribution part 31 calls createAuthTicketResponse, which is a method that the authentication service 30 provides, while using the Web service use ticket ID, and the like, as the argument.

Then the SOAP stub 35 creates the Web service use ticket acquisition response shown in FIG. 15 that contains the Web service use ticket ID to be described later and transmits the same to the client 3.

Hereinafter, an example of the Web service use ticket acquisition response will be explained by using FIG. 15.

FIG. 15 is a diagram explaining an example of the Web service use ticket acquisition response.

As shown in FIG. 15, the tag <Return xsi: type='xsd:base64Binary'></return> of the Web service use ticket acquisition response includes the Web service use ticket ID.

The client 3 that has acquired the Web service use ticket ID transmits a session start request including the Web service use ticket ID to the directory service 40, as will be described later.

Hereinafter, an example of the internal structure of the Web service use ticket 60 will be described by using FIG. 16.

FIG. 16 is a diagram that explains an example of the internal structure of the Web service use ticket.

As shown in FIG. 16, the Web service use ticket 60 contains the Web service use ticket ID, authentication ticket ID, target, and the term of validity.

The Web service use ticket ID holds the distinction information that distinguishes the Web service use ticket 60.

The authentication ticket ID holds the distinction information distinguishing the authentication ticket 50 provided by the authentication provider (such as the authentication provider A33). The target holds the character set distinguishing the Web service provided by the authentication provider (such as the authentication provider A33). The term of validity holds the term of validity of the Web service use ticket 60 provided from the authentication provider (for example, authentication provider A33).

Further, it should be noted that the contents of the authentication ticket 50 shown in FIG. 10 may be included in the Web service use ticket 60 as they are, in replace of the authentication ticket ID.

Hereinafter, the concept figure of the data inside the ticket managing part 32 will be explained by using FIG. 17.

Figure 17:
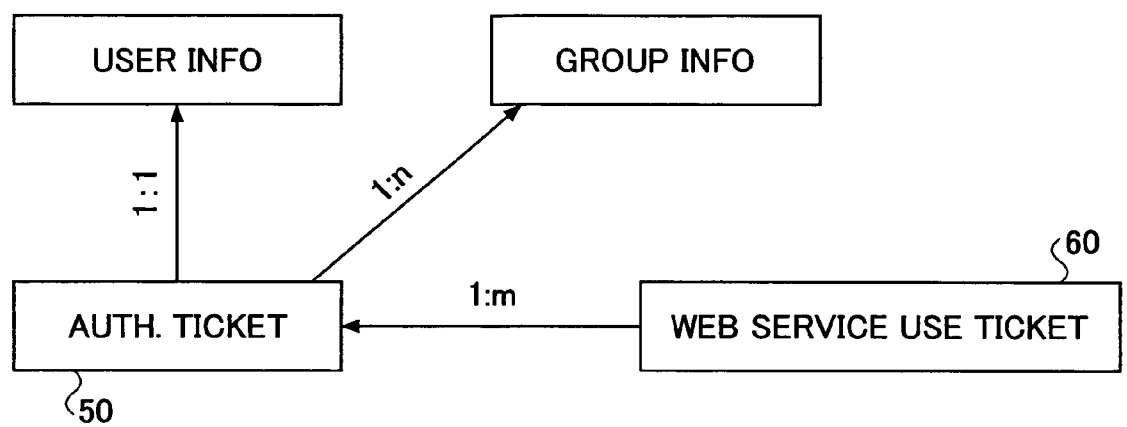
FIG. 17 is a concept diagram of the data inside a ticket administration part.

FIG. 17 is the diagram showing the concept of the data inside the ticket managing part.

As shown in FIG. 17 the user information explained in FIG. 11 is related to the authentication ticket 50 explained in FIG. 10 in one to one correspondence.

Further, the group information explained in FIG. 12 is related to the authentication ticket 50 in one to n correspondence (n is a natural number equal to or larger than n). This reflects the situation in which the certified user does not belong to any of the groups or may belong to plural groups.

Also, the Web service use ticket 60 explained in FIG. 16 is related to the authentication ticket 50 in one to m correspondence (m is a natural number equal to or larger than 1). This reflects the situation that the Web service providing server 2 may provide plural Web services.

Hereinafter, an example of the Web service use ticket creation processing will be explained by using FIG. 18.

Figure 18:
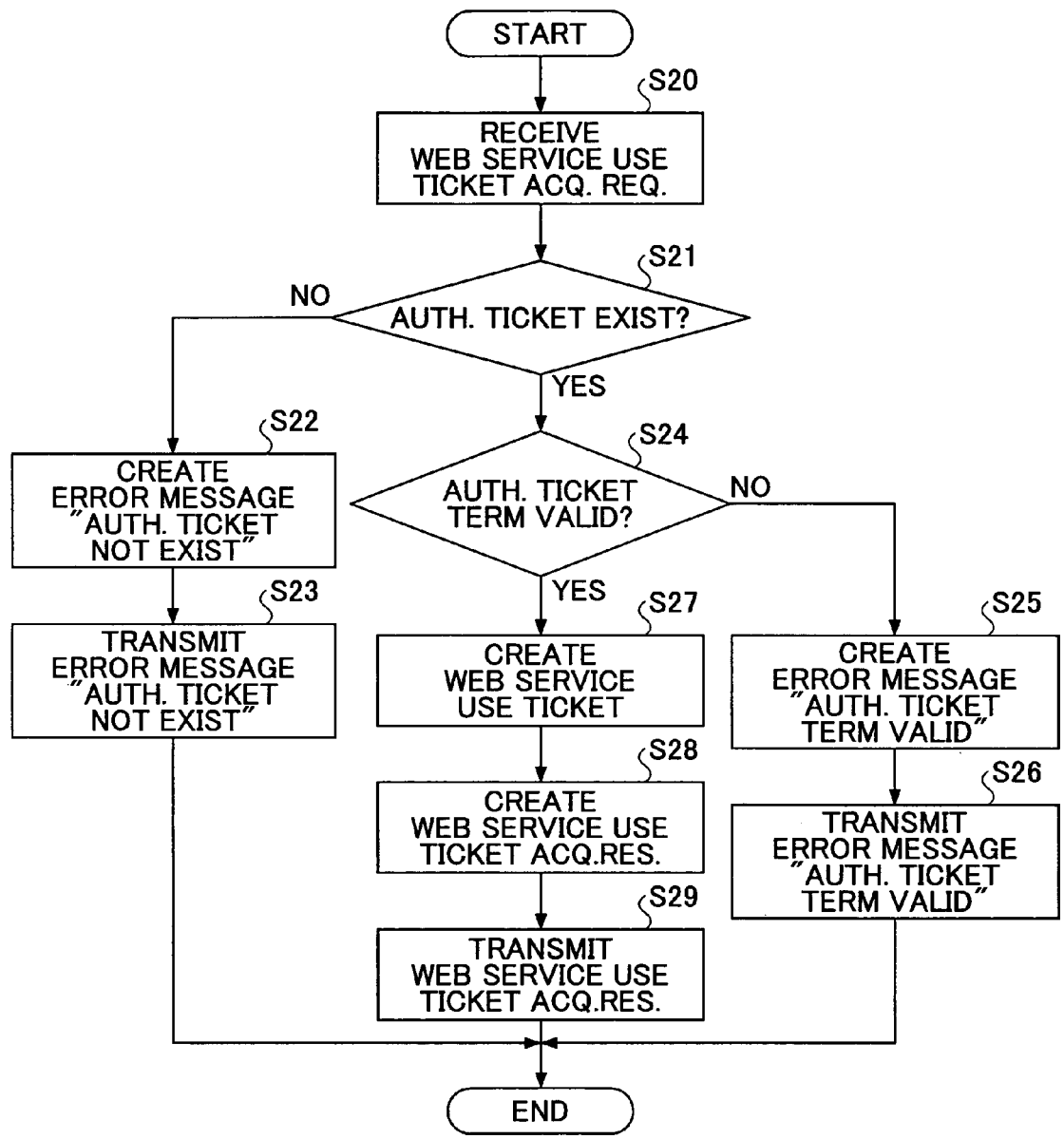
FIG. 18 is a flowchart explaining an example of a Web service use ticket creation processing.

FIG. 18 is a flowchart for explaining an example of the Web service use ticket creation processing.

In the step S20, the SOAP stub 35 receives the Web service use ticket acquisition request shown in FIG. 14 from the client 3. As mentioned above, the SOAP stub 35 that has received the Web service use ticket acquisition request calls createAuthTicket, which is a method that the authentication service 30 provides while using each parameter included in the Web service use ticket acquisition request as an argument.

After the step S20, the process proceeds to the step S21 and the authentication distribution part 31 determines whether or not there exists the authentication ticket 50 corresponding to that authentication ticket ID on the basis of the authentication ticket ID, which is one of the above-mentioned parameters. When it is determined in the Authentication distribution part 31 that the authentication ticket 50 corresponding to the above-mentioned authentication ticket ID exists (YES in step S21), the process proceeds to the step S24, while when it is determined that the authentication ticket 50 corresponding to the above-mentioned authentication ticket ID does not exist (NO in step S21), the process proceeds to step S22.

For example, the authentication distribution part 31 submits inquiry to the ticket managing part 32 about whether or not there exists an authentication ticket 50 containing the above-mentioned authentication ticket ID and corresponding to that authentication ticket ID and determines that the authentication ticket 50 corresponding to the above-mentioned authentication ticket ID exists in the case that the answer is given from the ticket managing part 32 indicating that the authentication ticket 50 exists.

On the other hand, in the event there is provided an answer from the ticket managing part 32 indicating that the authentication ticket 50 corresponding to the above-mentioned authentication ticket ID does not exist, authentication distribution part 31 determine that the authentication ticket 50 corresponding to the above-mentioned authentication ticket ID does not exist.

In the step S22, the authentication distribution part 31 calls a predetermined method that the authentication service 30 provides and requests creation of error message indicating that the corresponding authentication ticket 50 does not exist. The SOAP stub 35 creates an error message indicating that the corresponding authentication ticket 50 does not exist in correspondence to the above-mentioned request.

Following the step S22, the process proceeds to the step S23 and the SOAP stub 35 transmits the error message created in the step S22 to the client 3 terminates the processing.

On the other hand, in the step S24, the authentication distribution part 31 determines, on the basis of the above-mentioned authentication ticket ID, whether or not the term of validity of the authentication ticket 50 corresponding to the authentication ticket ID is over.

When it is determined that the term of validity of the authentication ticket 50 corresponding to the above-mentioned authentication ticket ID is not over (YES in step S24), the authentication distribution part 31 acquires the provider name included in the authentication ticket 50 corresponding to the above-mentioned authentication ticket ID from the above-mentioned authentication ticket ID on the basis of the ticket administration part 32, and provides the above-mentioned authentication ticket ID, the effective time of the Web service use ticket 60, the target, and the like, to the authentication provider corresponding to the provider name (for example, authentication provider A33).

The authentication provider A33 provides the above-mentioned authentication ticket ID, the term of validity of the Web service use ticket 60, the target, and the like, to the ticket managing part 32 and requests creation of the Web service use ticket 60. Thereafter, the process proceeds to the step S27.

On the other hand, when it is determined that the term of validity of the authentication ticket 50 corresponding to the above-mentioned authentication ticket ID is over (NO in step S24), the authentication distribution part 31 proceeds to the step S25.

For example, the authentication distribution part 31 submits inquiry to the ticket managing part 32 as to whether or not the term of validity of the authentication ticket 50 containing the above-mentioned authentication ticket ID and corresponding to the authentication ticket ID is over, and determines that the term of validity of the authentication ticket 50 corresponding to the above-mentioned authentication ticket ID is not over in the event the ticket managing part 32 provided the answer indicating that the term of validity of the authentication ticket 50 corresponding to the authentication ticket ID is over.

On the other hand, the authentication distribution part 31 determines when the ticket managing part 32 provides an answer indicating that the term of validity of the authentication ticket 50 corresponding to the above-mentioned authentication ticket ID is over, that the term of validity of the authentication ticket 50 corresponding to the above-mentioned authentication ticket ID is over.

Next, in the step S25, the authentication distribution part 31 calls a predetermined method that the authentication service 30 provides, and requests creation of an error message indicating that the term of validity of the corresponding authentication ticket 50 is over. Then, the SOAP stub 35 creates the error message indicating that the term of validity of the corresponding authentication ticket 50 is over in response to the above-mentioned request.

Next, the process proceeds from the step S25 to the step S26 and the SOAP stub 35 transmits the error message created in the step S25 to the client 3 and terminates the processing.

In the step S27, on the other hand, the ticket managing part 32 that has received the creation request of the above-mentioned Web service use ticket 60 creates the Web service use ticket 60 shown in FIG. 16 and provides the Web service use ticket ID, which is the distinction information that distinguishes that Web service use ticket 60, to the authentication provider A33 as the Web service use ticket 60.

After the step S27, the process proceeds to the S28 and the authentication distribution part 31 provided with the above-mentioned Web service use ticket ID from the authentication provider A33 calls createAuthTicketResponse, which is a method that the authentication service 30 provides, while using the above-mentioned Web service use ticket ID as the argument. Then the SOAP stub 35 creates the Web service use ticket acquisition response including the above-mentioned Web service use ticket ID shown in FIG. 15 based on the request from the authentication distribution part 31.

After the step S28, the process proceeds to the step S29 and the SOAP stub 35 transmits the Web service use ticket acquisition response created in the step S28 to the client 3 in response to the request from the authentication distribution part 31.

Furthermore, as shown in FIG. 18, the authentication service 30 transmits the error message indicating the authentication ticket 50 does not exist and the error message indicating that the term of validity of the authentication ticket 50 is over to the client 3 individually.

For example, in the case that client 3 holds the password, and the like, once input by the user, the client 3, upon reception of the error message indicating that the term of validity of the authentication ticket 50 is over from the authentication service 30, can transmit the acquisition request of the authentication ticket 50 once again to the authentication service 30 by using the above-mentioned password.

Furthermore, the authentication service 30 eliminates, when the elimination method that the authentication service 30 provides is called or when a predetermined period (for example, one hour after the authentication ticket 50 is created) has elapsed, the corresponding authentication ticket 50

Hereinafter, an example of the session start request will be explained by using FIG. 19.

FIG. 19 is a diagram for explaining an example of the session start request.

As shown in FIG. 19, the tag <AuthTicket></authTicket> of the session start request includes the Web service use ticket ID as a parameter.

Also, the tag <TimeLimit></timeLimit> includes the valid time of the session 70 is included as a parameter in terms of second.

For example, the SOAP stub 45 that has received the session start request shown in FIG. 19 calls startSessionByAuthTicket, which is the method that the directory service 40 provides, while using each of the above-mentioned parameters as an argument.

Then, the directory distribution part 41 calls decodeAuthTicket, which is a method that the directory service 40 provides while using the Web service use ticket ID and also the character set that the directory service 40 provides for distinguishing the service as arguments.

Then the SOAP stub 45 creates a Web service use ticket decoding request including the above-mentioned Web service use ticket ID and also the character set for distinguishing the service that the directory service 40 provides as will be described later in FIG. 21, and transmits the same to the authentication service 30.

Furthermore, the information regarding the authentication service 30 (URL etc., for example) is acquired by the address directory distribution part 41 from the HDD29 etc. and may be submitted to the SOAP stub 45 as the argument of method decodeAuthTicket. Alternatively, the client 3 may transmit the URL, and the like of the authentication service 30, which is the destination of transmission of the Web service use ticket decoding request, in the form included in the session start request, to the directory service 40, such that the directory distribution part 41 provides the URL of the authentication service 30 as an argument of the method decodeAuthTicket to the SOAP stub 45.

Hereinafter, another example of the session start request will be explained by using FIG. 20.

FIG. 20 is a diagram that explains an example of other session start request.

In the session start request shown in FIG. 20, the tag <uauthenticationUrl></uauthenticationUrl> includes the URL of the authentication service 30 as a parameter.

The directory service 40 transmits the Web service use ticket decoding request shown in FIG. 21 to be described later to the authentication service 30 based on the URL of the authentication service 30.

Further, although not illustrated, the client 3 man transmit the provider name of the directory provider in the form included in the session start request shown in FIG. 19 and/or FIG. 20, to the directory service 40. By using such a construction, the client 3 can designate the directory provider.

Hereinafter, an example of the Web service use ticket decoding request will be explained by using FIG. 21.

FIG. 21 is a diagram for explaining an example of the Web service use ticket decoding request.

As shown in FIG. 21, the tag <authTicket></authTicket> of the Web service use ticket decoding request includes the Web service use ticket ID as a parameter.

Also, the tag <target></target> includes the character set for distinguishing the service that the directory service 40 provides.

For example, the SOAP stub 35 that has received the Web service use ticket decoding request shown in FIG. 21 calls decodeAuthTicket, which is the method that the authentication service 30 provides, while using each of the above-mentioned parameters as an argument.

Then, the authentication distribution part 31 determines whether or not there exists a valid Web service use ticket 60 corresponding to the above-mentioned Web service use ticket ID, whether or not the target included in the Web service use ticket 60 is identical to the character set for distinguishing the service provided by the directory service 40, and the like, based on the above-mentioned Web service use ticket ID and/or the character set for distinguishing the service that the directory service 40 provides.

When it is determined that there exists a valid Web service use ticket 60 corresponding to the above-mentioned Web service use ticket ID and that the target included in the Web service use ticket 60 and the character set for distinguishing the service that the above-mentioned directory service 40 provides are the same, the authentication distribution part 31 acquires the contents of the Web service use ticket 50 (except for authentication ticket ID) as shown in FIG. 10 and/or the content of the authentication ticket 60 (except for Web service use ticket ID and authentication ticket ID) as shown in FIG. 16 on the basis of the authentication ticket ID that is included in the corresponding Web service use ticket 60 and calls decodeAuthTicketResponse, which is a method that the authentication service 30 provides, while using such information and the result of determination to be described later as an argument.

Then the SOAP stub 35 creates the Web service use ticket decoding response including the above-mentioned determination result, the contents of the authentication ticket 50 and/or the contents of the Web service use ticket 60, and transmits the same to the directory service 40.

Hereinafter, an example of the Web service use ticket decoding response will be explained by using FIG. 22.

FIG. 22 is a diagram for explaining an example of the Web service use ticket decoding response.

As shown in FIG. 22, the tag of the Web service use ticket decoding response <return xsi: type='xsd: string'></return> includes the result of the determination.

With regard to the result of the determination, OK is included in the foregoing tag in the event for example there exists a valid Web service use ticket 60 corresponding to the Web service use ticket ID included in the above-mentioned Web service use ticket decoding request and the target included in the Web service use ticket 60 is identical to the character set for distinguishing the service that the directory service 40 included in the above-mentioned Web service use ticket decoding request provides.

On the other hand, in the case there exists no valid Web service use ticket 60 corresponding to the Web service use ticket ID included in the above-mentioned Web service use ticket decoding request, or in the case the target included in the above-mentioned Web service use ticket 60 is not the same as the character set for distinguishing the service provided by the directory service 40 contained in the above-mentioned Web service use ticket decoding request, NO is written to the above-mentioned tag.

Furthermore, the Web service use ticket decoding response may include the contents of authentication ticket 50 (except for authentication ticket ID) and/or the contents of the Web service use ticket 60 (except for Web service use ticket ID and authentication ticket ID) as noted above.

The SOAP stub 45 that has received the Web service use ticket decoding response as shown in FIG. 22, for example, provides the valid time, and the like, of the above-mentioned Web service use ticket ID and also the above-mentioned session 70 to the corresponding directory provider (for example, directory provider A43) on the basis of the provider name included the Web service use ticket decoding response.

Furthermore, in the case that a provider name of a directory provider is included in the session start request, it is possible to provide the above-mentioned Web service use ticket ID and the valid time, and the like, of and the above-mentioned session 70 to the corresponding directory provider (for example, directory provider A43) based on the provider name.

The directory provider A43 provides the above-mentioned Web service use ticket ID and the valid time, and the like, of the above-mentioned session 70 to the session managing part 42 and requests creation of the session 70.

The session managing part 42 that has received the above-mentioned request creates the session 70 shown in FIG. 24 to be described later and provides the session ID, which is the distinction information for distinguishing the session 70, to the directory provider A43 as the session 70.

The directory provider A43 provides the above-mentioned session ID to the directory distribution part 41.

The Directory distribution part 41 calls startSessionByAuthTicketResponse, which is the method that directory service 40 provides, while using the above-mentioned session ID, and the like, as the argument.

Then the SOAP stub 45 creates the session start response shown in FIG. 23 that contains the above-mentioned session ID as will be described later and transmits the same to the client 3.

Hereinafter, an example of the session start response will be explained by using FIG. 23.

FIG. 23 is a diagram for explaining an example of the session start response.

As shown in FIG. 23, the tag <returnValue xsi: type='xsd:string'></returnValue> of the session start response includes the above-mentioned session ID.

For example, the client 3 that has acquired the session ID transmits the directory service use request including that session ID to the directory service 40, as will be described later.

Hereinafter, an example of the internal structure of session 70 will be explained by using FIG. 24.

FIG. 24 is a diagram for explaining an example of the internal structure of the session.

As shown in FIG. 24, the session 70 includes the session ID, the Web service use ticket ID, and the term of validity.

The session ID holds the distinction information that distinguishes the session 70. The Web service use ticket ID holds the distinction information for distinguishing the Web service use ticket 60 provided from the directory provider (for example, directory provider A43). The term of validity of session holds the term of validity 70 provided from the directory provider (for example, directory provider A43).

Hereinafter, an example of the session creation processing will be explained by using FIG. 25.

Figure 25:
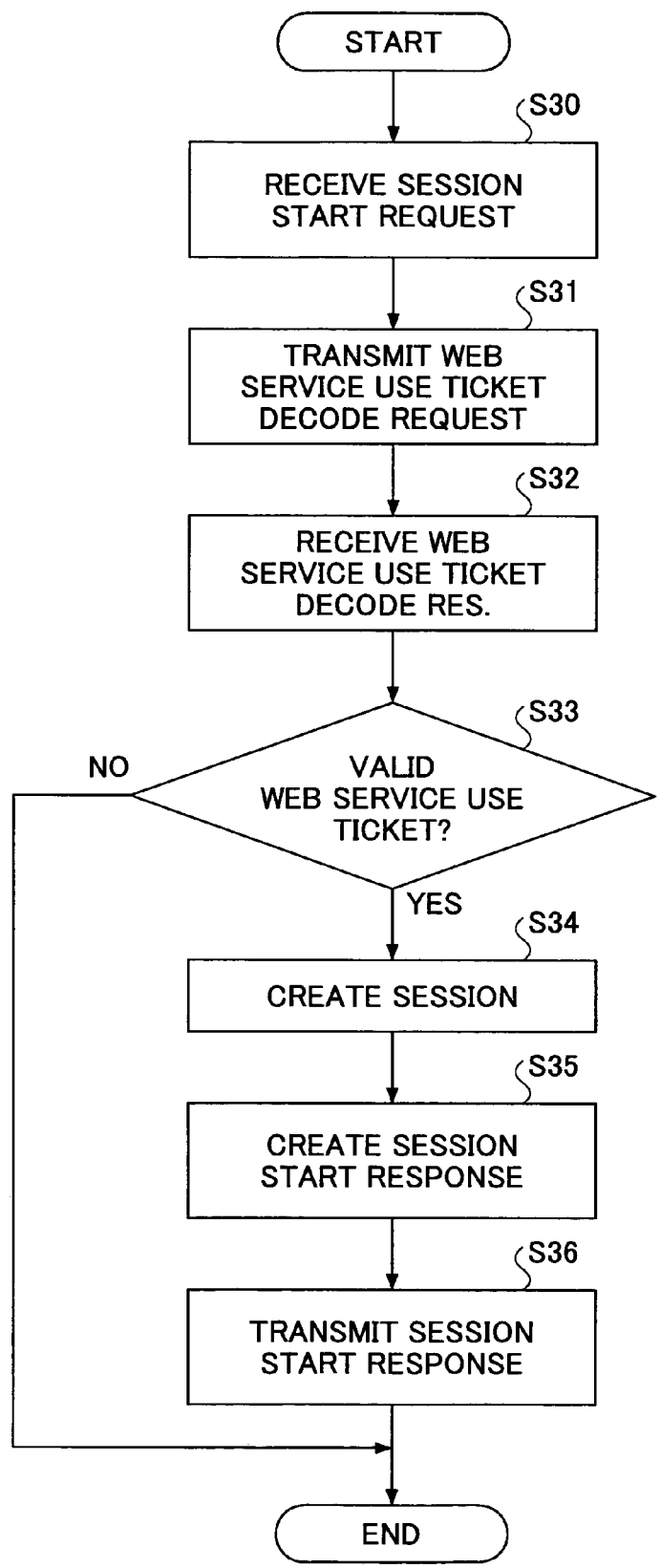
FIG. 25 is a flowchart explaining an example of a session creation processing.

FIG. 25 is a flowchart for explaining an example of the session creation processing.

In the step S30, the SOAP stub 45 receives a session start request shown in FIG. 19 from the client 3.

As mentioned above, the SOAP stub 45 that has received the session start request calls startSessionByAuthTicket, which is a method that the directory service 40 provides, while using the Web service use ticket ID included in the session start request or the parameter of the valid time, and the like, of the session 70 as the arguments.

Then the directory distribution part 41 calls decodeAuthTicket, which is a method that the directory service 40 provides, while using the Web service use ticket ID and the character set for distinguishing the service that the directory service 40 provides.

Next, the process proceeds from the step S30 to the step S31 and the SOAP stub 45 creates the Web service use ticket decoding request shown in FIG. 21 that includes the above-mentioned Web service use ticket ID and the character set for distinguishing the service that the directory service 40 provides, and transmits the same to the authentication service 30.

After the step S31, the process proceeds to the step S32 and the SOAP stub 45 receives the Web service use ticket decoding response shown in FIG. 22 from the authentication service 30. As mentioned above, the SOAP stub 45 that has received the Web service use ticket decoding response calls decodeAuthTicketResponse, which is a method that the directory service 40 provides, while using the decoding result included in the Web service use ticket decoding response (referred to hereinafter as determination result), the contents of the authentication ticket 50 (except for authentication ticket ID) and/or the contents of the Web service use ticket 60 (except for Web service use ticket ID and authentication ticket ID) as the arguments.

After the step S32, the process proceeds to the step S33, and the directory distribution part 41 determines whether or not the Web service use ticket ID that has been transmitted to authentication service 30 in the form included in the Web service use ticket decoding request in the step S31 is the Web service use ticket ID of a valid Web service use ticket 60.

When it is determined that the above-mentioned Web service use ticket ID is the Web service use ticket ID of a valid Web service use ticket 60 (YES in step S33), The directory distribution part 41 provides the effective time, and the like, of the above-mentioned Web service use ticket ID and also above-mentioned session 70 to the corresponding directory provider (for example, directory provider A43), on the basis of the provider name contained in the Web service use ticket decoding response.

The directory provider A43 provides the above-mentioned Web service use ticket ID and the valid time, and the like, of the above-mentioned session 70 to the session managing part 42 and requests creation of the session 70. Thereafter, the process proceeds to the step S34.

On the other hand, directory distribution part 41 determines the processing when it is determined that the above-mentioned Web service use ticket ID is not the Web service use ticket ID of a valid Web service use ticket 60 (NO in step S33).

Furthermore, in the case the above-mentioned Web service use ticket ID has been determined as not being the Web service use ticket ID of a valid Web service use ticket 60, the directory distribution part 41 may call a predetermined method that the directory service 40 provides and creates an error message indicating that the Web service use ticket ID was not the Web service use ticket ID of a valid Web service use ticket 60 and transmit the same to the client 3.

For example, the directory distribution part 41 determines, in the case the parameter OK is contained in the Web service use ticket decoding response that has been received in the step S32, that it is a Web service use ticket ID of a valid Web service use ticket 60, while in the case the Web service use ticket decoding response has included the parameter NO, it determines that the Web service use ticket ID is a Web service use ticket ID of an invalid Web service use ticket 60.

Next, in the step S34, the session managing part 42 creates the session 70 as shown in FIG. 24 and provides the session ID, which is the distinction information for distinguishing the session 70, to the to directory provider A43 as the session 70.

After the step S34, the process proceeds to the step S35 and the directory distribution part 41 provided with the above-mentioned session ID from the directory provider A43 calls startSessionByAuthTicketResponse while using the above-mentioned session ID, and the like, as the argument. Then the SOAP stub 45 creates the session start response including the session ID as shown in FIG. 23 on the basis of the request from the directory distribution part 41.

After the step S35, the process proceeds to the step S36 and the SOAP stub 45 transmits the session start response that has been created in the step S35 on the basis of the request from the directory distribution part 41, to the client 3.

Hereinafter, an example of the Web service use ticket decoding processing will be explained by using FIG. 26.

Figure 26:
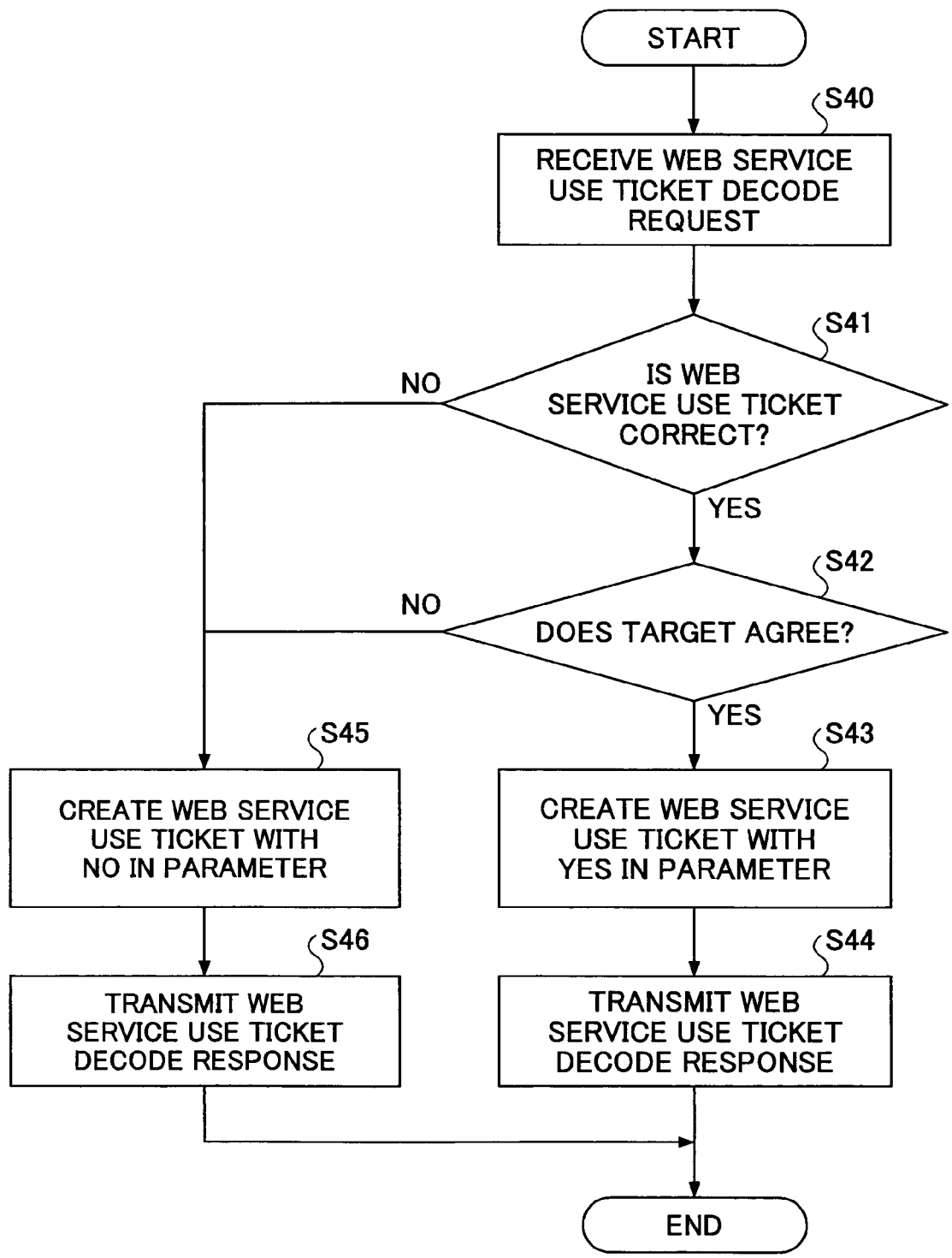
FIG. 26 is a flowchart explaining an example of a Web service use ticket decoding processing.

FIG. 26 is a flowchart for explaining an example of the Web service use ticket decoding processing.

In the step S40, the SOAP stub 35 receives the Web service use ticket decoding request shown in FIG. 21 from the directory service 40. As mentioned above, the SOAP stub 35 that has received the Web service use ticket decoding request calls decodeAuthTicket, which is a method that the authentication service 30 provides, while using parameters such as the Web service use ticket ID included in the Web service use ticket decoding request or the character set for distinguishing the service that the directory service 40 provides as the argument.

After the step S40, the process proceeds to the step S41 and the authentication distribution part 31 determines whether or not the Web service use ticket ID is a valid Web service use ticket ID, on the basis of the Web service use ticket ID, which is one of the foregoing parameters.

When the authentication distribution part 31 has determined that the above-mentioned Web service use ticket ID is correct (YES in step S41), the process proceeds to the step S42, while when it is determined that the Web service use ticket ID is not correct (No in step S41), the process proceeds to the step S45.

For example, the authentication distribution part 31 submits inquiry to the ticket managing part 32 about whether or not there exists a valid Web service use ticket 60 corresponding to the Web service use ticket ID including the above-mentioned Web service use ticket ID, and in the case there was given the answer from the ticket administration part 32 indicating that there exists a corresponding valid Web service use ticket 60, the authentication distribution part 31 determines that it is a correct Web service use ticket ID.

On the other hand, when there was given an answer from the ticket managing part 32 indicating that there exists no valid Web service use ticket 60 corresponding to the above-mentioned Web service use ticket ID, the authentication distribution part 31 determines that it an incorrect Web service use ticket ID.

In the step S42, the authentication distribution part 31 determines whether or not the character set, which is one of the above-mentioned parameters, for distinguishing the service that the directory service 40 provides agrees with the character set of the target contained in the service use ticket 60 corresponding to the above-mentioned Web service use ticket ID.

When it is determined in the authentication distribution part 31 that the above-mentioned two character sets agree to each other (YES in step S42), the process proceeds to the step S43, while in the case it is determined that the two character sets do not agree to each other (NO in step S42), the process proceeds to the step S45.

In the step S43, the authentication distribution part 31 acquires, based on the above-mentioned Web service use ticket ID, the contents of the corresponding Web service use ticket 60 (except for authentication ticket ID) and/or the contents of the authentication ticket 50 (except for the Web service use ticket ID and the authentication ticket ID) and calls decodeAuthTicketResponse, which is the method that the authentication service 30 provides while using these information and the determination result (YES) as the arguments.

Then the SOAP stub 35 creates the Web service use ticket decoding response including the result of the above-mentioned determination (YES) and the contents of the authentication ticket 50 and/or the contents of the Web service use ticket 60, and the like.

After the step S43, the process proceeds to the step S44 and the SOAP stub 35 transmits the Web service use ticket decoding response created in the step S43 to the directory service 40.

On the other hand, in the step S45, the authentication distribution part 31 calls decodeAuthTicketResponse, which is the method that the authentication service 30 provides, while using g the result of the determination (NO) as the argument.

Then, the SOAP stub 35 creates the Web service use ticket decoding response including the result of the above-mentioned determination (NO), and the like.

After the step S45, the process proceeds the to step S46 and the SOAP stub 35 transmits the Web service use ticket decoding response created in the step S45 to the directory service 40.

As shown in FIG. 25 and FIG. 26, the directory service 40 transmits the distinction information of itself (for example, the character set of repositoryService, and the like) to the authentication service 30 together with the Web service use ticket ID included in the request from the client 3. On the other hand, the authentication service 30 determines the validity of the Web service use ticket 60 by comparing the distinction information (for example, the character set of repositoryservice etc.) transmitted from the directory service 40 and the target contained in the Web service use ticket 60 on the basis of the above-mentioned Web service use ticket ID.

By using such authentication method, it becomes possible to provide the service of authentication efficiently without setting up new information, and the like, in the authentication service provider server 1 and/or the authentication service 30, even in the case a new Web service that the client 3 uses and requires authentication is added to the Web service providing server 2, and the like.

In the step S43 of FIG. 26, explanation has been given for the case in which the authentication distribution part 31 acquires, on the basis of the above-mentioned Web service use ticket ID, the contents of corresponding the Web service use ticket 60 (except for the Web service use ticket ID and the authentication ticket ID) and/or the contents of authentication ticket 50 (except for the authentication ticket ID), while the authentication distribution part 31 may acquire, on the basis of the above-mentioned Web service use ticket ID, only the corresponding provider name from the ticket administration department 32, and requires acquisition of the contents of the Web service use ticket 60 corresponding to the above-mentioned Web service use ticket ID and/or the contents authentication ticket 50 to the provider corresponding to the provider name (for example, authentication provider A33).

In this case, the authentication provider A33 that has received the request provides the request to the ticket managing part 32. Te ticket managing part 32 that has received the request acquires, on the basis of the Web service use ticket ID included in the request, the contents of the corresponding Web service use ticket 60 (except for Web service use ticket ID and authentication ticket ID) and/or the contents of the authentication ticket 50 (except for authentication ticket ID), and provides the same to the authentication provider A33. The authentication provider A33 provides the contents of the Web service use ticket 60 (except for Web service use ticket ID and also authentication ticket ID) and/or the contents of the authentication ticket 50 (except for authentication ticket ID) thus acquired to the authentication distribution part 31.

Hereinafter, an example of the directory service use request will be explained by using FIG. 27.

FIG. 27 is a diagram for explaining an example of the directory service use request.

As shown in FIG. 27, the tag <sessionId></sessionId> of the directory service use request contains the session ID as a parameter.

The directory service 40 determines whether or not the session ID included in the directory service use request is a valid session ID, and when it is determined that it is a valid session ID, and acquires the user list according to the request of the client 3. Further, the directory service 40 creates the directory service use response shown in FIG. 28 to be described later and transmits the same to the client 3.

Hereinafter, an example of the directory service use response will be explained by using FIG. 28.

FIG. 28 is a diagram for explaining an example of the directory service use response.

Each of the tags included in the tag <item></item> of the directory service use response shown in FIG. 28 contains information regarding the user list.

Hereinafter, an example of the user list acquisition processing will be explained by using FIG. 29.

Figure 29:
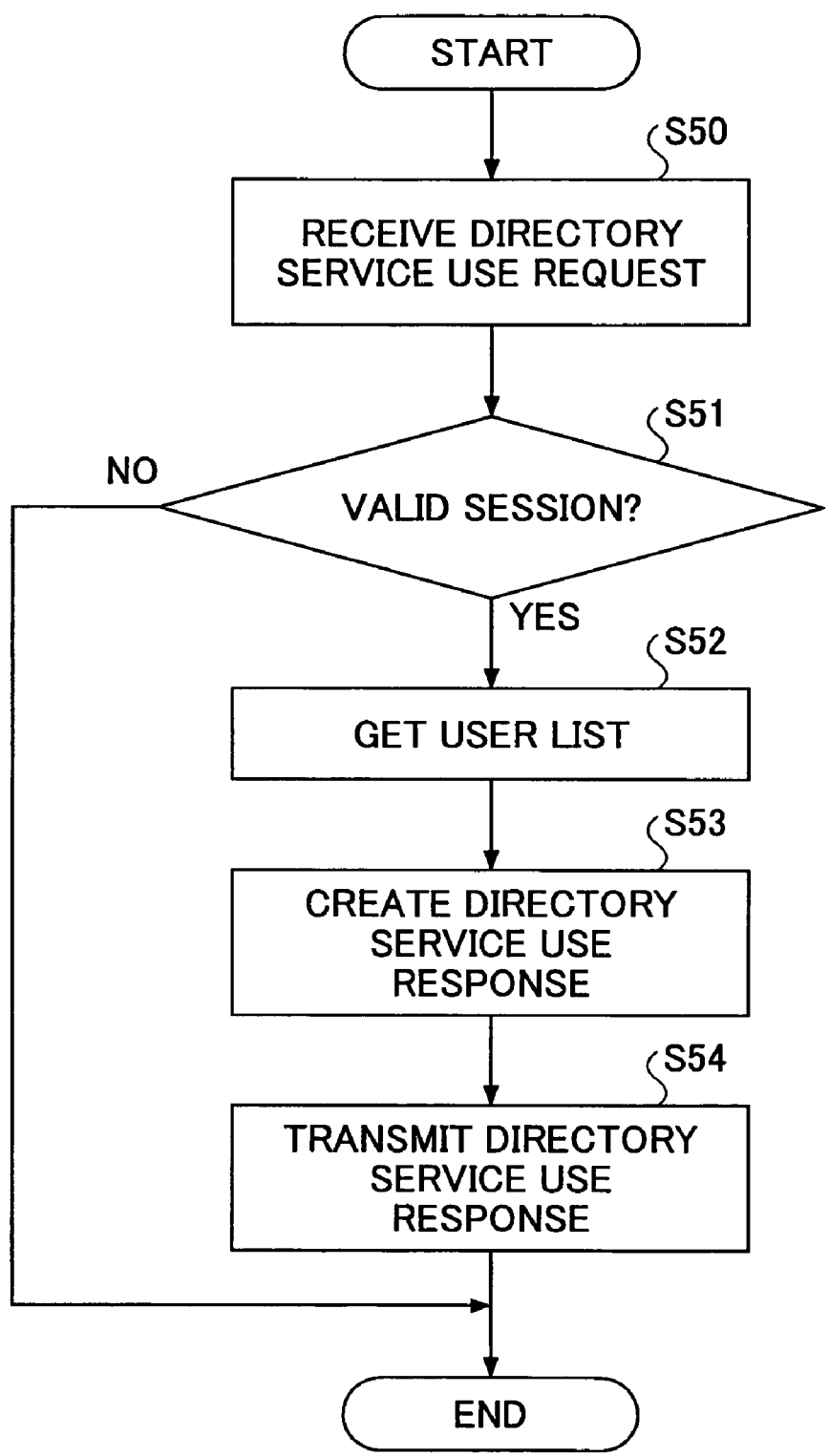
FIG. 29 is a flowchart showing an example of a user list acquisition processing.

FIG. 29 is a flowchart showing an example of the user list acquisition processing.

In the step S50, the SOAP stub 45 receives from the client 3 the directory service use request shown in FIG. 27. The SOAP stub 45 that has received the directory service use request calls getEntryList, which is the method that the directory service 40 provides while using each of the parameters included in the directory service use request as the argument.

After the step S50, the process proceeds to the step S51 and the directory distribution part 41 determines whether or not the session ID, which is one of the parameters contained in the above-mentioned directory service use request, is a valid session ID.

When it is determined the session ID is a valid session ID (YES in step S51), the directory distribution part 41 proceeds to the step S52, while when it is determined that the session ID is not a valid session ID (NO in step 52), the processing is terminated.

In the case it is determined the session ID is not a valid session ID, the directory distribution part 41 may create an error message indicating the same and transmit the same to the client 3.

For example, the directory distribution part 41 submit inquiry to the session managing part 42 by using the session ID included in the directory service use request whether or not there exists the session 70 including the session ID corresponding to the above-mentioned session ID and/or whether or not the term of validity of the session 70 that includes the corresponding session ID is over.

When a response indicating that there exists such a session ID and/or the term of validity of the session 70 including the corresponding session ID is not over is acquired from the session managing part 42, the directory distribution part 41 determines that this is a valid session ID.

In the step S52, the corresponding directory provider (for example, directory provider A43) acquires the user list.

Following the step S52, the process proceeds to the Step S53 the directory distribution part 41 that has been provided with the above-mentioned user list from the directory provider A43 calls getEntryListResponse, which is a method that the directory service 40 provides, while using the user list as the argument. Then SOAP stub 45 creates, based on the request from the directory distribution part 41, the directory service use response that contains the above-mentioned user list shown in FIG. 28.

Following the step S53, the process proceeds to the step S54 and the SOAP stub 4.5 transmits the directory service use response created in the step S53 to the client 3.

Hereinafter, another example of the authentication service providing method and/or Web service providing method will be explained by using FIG. 30.

For example, in the authentication service providing method and/or Web service providing method of FIG. 5, explanation has been made for the case the client knows, when using a Web service (for example, directory service 40), as to what authentication service the request for authentication should be submitted or the URL of that authentication service or the distinction information (for example, the character set of repositoryservice etc.) for distinguishing the directory service 40, which becomes necessary when using the directory service 40.

Figure 30:
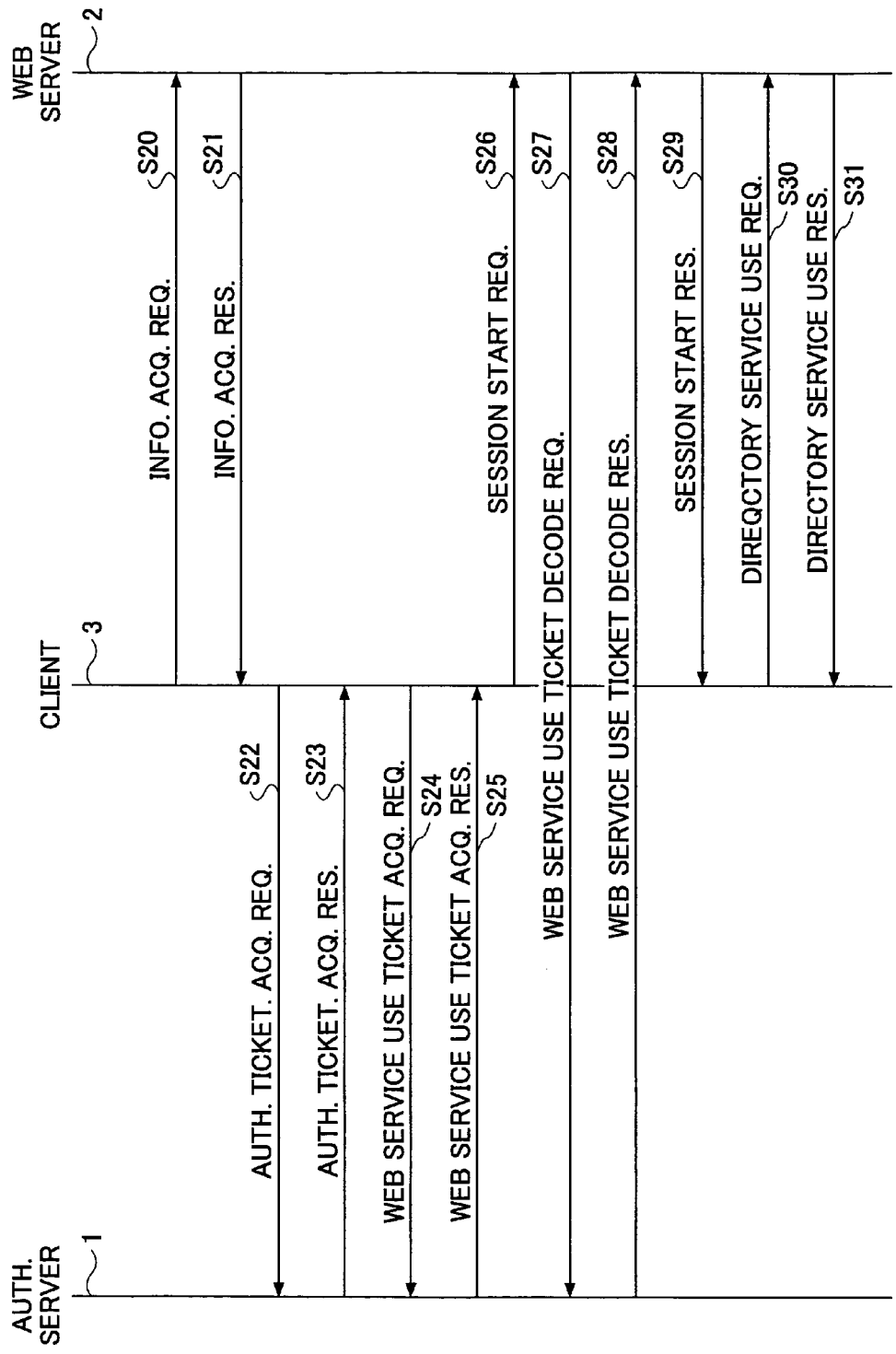
FIG. 30 is a second sequence diagram explaining authentication service providing method and/or Web service providing method.

In FIG. 30 shown below, explanation will be made for the example in which the client 3 inquires the URL of the authentication service that becomes necessary when using the director service 40 and the distinction information for distinguishing the directory service 40.

FIG. 30 is a second sequence diagram of explaining the authentication service providing method and/or Web service providing method.

As shown in FIG. 30, the client 3 that uses the Web service that the Web service providing server 2 provides (such as directory service 40) transmits an acquisition request (information acquisition request) to the directory service 40 for the information related to the authentication server that carries out the authentication (for example, URL of the authentication service, and the like) and/or the distinction information (for example, character set of repositoryservice, and the like) for distinguishing the directory service, which becomes necessary for using the directory service 40 (sequence SQ20 of FIG. 30).

The directory service 40 creates, in response to the above-mentioned information acquisition request from the client 3, an information acquisition response that includes: the URL of the authentication service 30 that provides the service regarding authentication and becomes necessary when using the directory service 40 and/or the character set such as repositoryservice, which becomes necessary when using the directory service 40 for distinguishing the directory service 40, and transmits the same to the client (sequence SQ21 of FIG. 30).

In the case of such a construction, the directory service 40 holds and manages the URL of the authentication service 30 that provides the service related to the authentication and becomes necessary at the time of using the directory service 40 and/or the character set of repositoryservice etc., which distinguishes the directory service 40 needed at the time of using the directory service 40.

The client 3 that has received the above-mentioned information acquisition response creates that the acquisition request of the authentication ticket 50 that certifies the user of the client 3 on the basis of the URL of the authentication service 30 included in the acquisition response, and transmits the same to the certification service 30 (sequence SQ22 of FIG. 30).

The authentication service 30 carries out the authentication on the basis of the user name, password etc. included in the authentication ticket acquisition request from the client 3 and creates the authentication ticket 50 including the ID of the authentication ticket 50 (authentication ticket ID) and transmits the same to the client 3 (sequence SQ23 of FIG. 30).

The client 3 transmits, when the authentication ticket acquisition response is received, the acquisition request of Web service use ticket 60, which includes the authentication ticket ID and the character set such as repositoryservice that distinguishes the directory service 40 acquired from the directory service 40 in the sequence SQ21 and transmits the same to the authentication service 30 (sequence SQ24 of FIG. 30).

The processing from the sequence SQ25 to the sequence SQ31 of FIG. 30 is similar to the processing from the sequence SQ4 to the sequence SQ10 of FIG. 5.

As shown in FIG. 30, as a result that the Web service (for example, directory service 40) holds and manages the information related to the authentication service 30 (for example, the URL etc. of the authentication service) and/or the distinction information that distinguishes the directory service 40 (for example, the character set of repositoryservice etc.), the client 3 can acquire the above-mentioned information merely by inquiring to the directory service 40, and the like, even in the case of not knowing URL of the authentication service 30 and/or the character set of the repositoryservice, and the like, distinguishes the directory service 40.

Further, it is possible, in the processing one step before the processing of FIG. 30, to transmit, in the case that the client 3 does not know the URL etc. of the Web service (for example, directory service 40) to be used, a search request for the URL of the directory service to a discovery service, and the like, which carries out searching of the Web service, and the like, and to transmit an information acquisition request to the directory service 40 like the sequence SQ20 shown in FIG. 30 while using the URL of the directory service 40 acquired from the discovery service.

In the case of such a construction, the client 3 can carry out the processing shown in FIG. 30, even in the case it does not know the URL, and the like, of the Web service to be used (for example, directory service 40), by acquiring the URL of the directory service 40, and the like, by using the discovery service.

Such a discovery service may be implemented in the authentication service providing server 1 or in the Web service providing server 2, or in a different server, and the like, or in the same server (apparatus) and the like, to the authentication service 30 and the directory service 40.

EMBODIMENT 2

In the embodiment 2, explanation will be made for the case in which there exist plural (two, for example) Web services other than the authentication service 30. Furthermore, the explanation of the second embodiment may be focused to the points different from the points explained in the embodiment 1.

Figure 31:
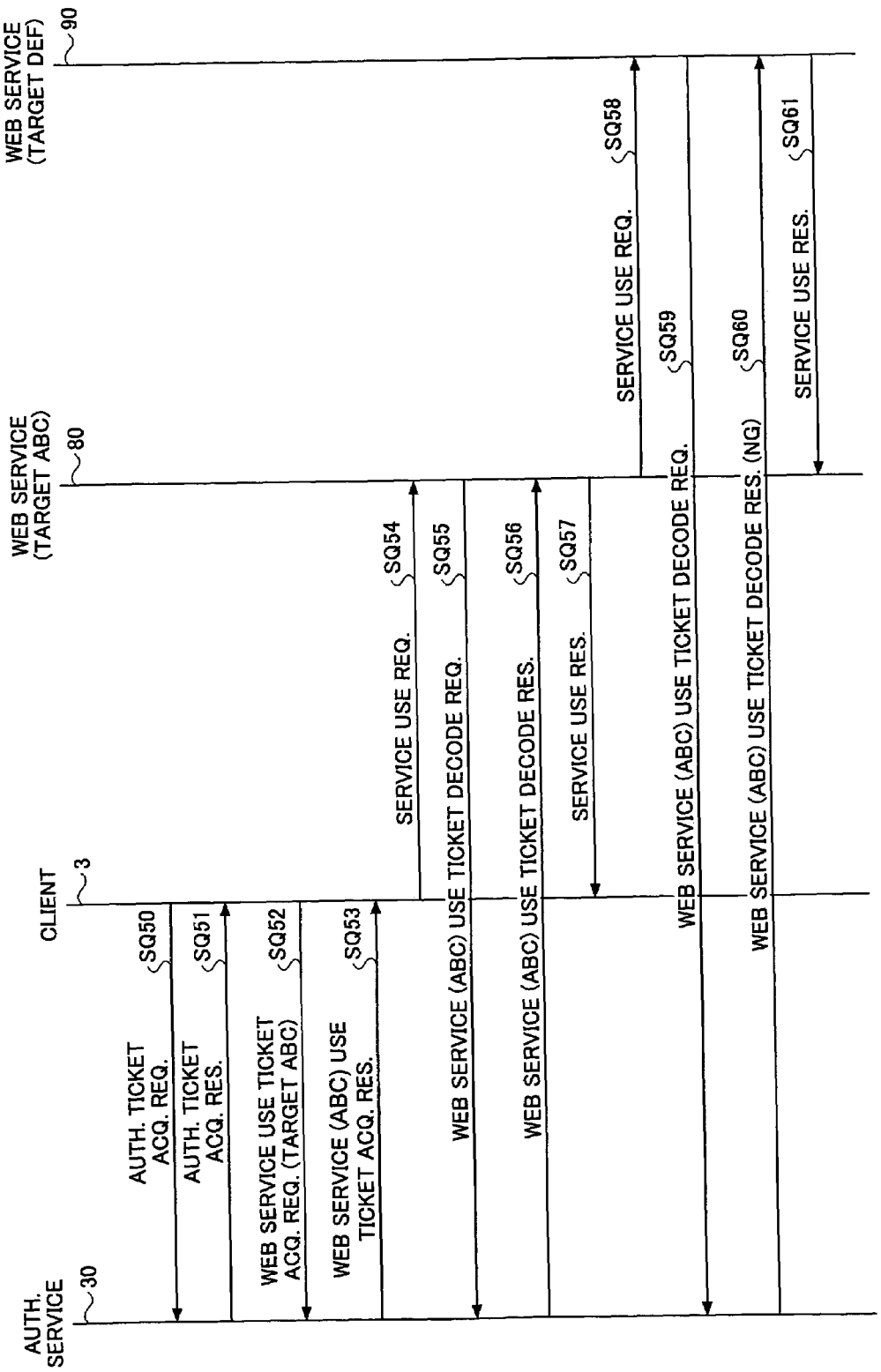
FIG. 31 is a sequence diagram explaining an authentication service providing method and/or Web service providing method for the case in which there exist plural Web services.

FIG. 31 is a sequence diagram for explaining the example of the authentication service providing method and/or the Web service providing method for the case in which there exist plural Web services.

As shown in FIG. 31, the client 3 that uses the service that a Web service 80 (referred to hereinafter also as Web service (target ABC) 80) distinguished by the target ABC provides, creates an acquisition request for the authentication ticket 50 that certifies the user of the client 3 and transmits the same to the authentication service 30 (sequence SQ50 of FIG. 31).

The authentication service 30 carries out the authentication on the basis of the user name, password, and the like, included in the authentication ticket acquisition request from the client 3, and creates the authentication ticket 50. Further, it creases an authentication ticket acquisition response including the ID (authentication ticket ID) of that authentication ticket 50 and transmits the same to the client 3 (sequence SQ51 of FIG. 31).

The client 3 creates, upon reception of the authentication ticket acquisition response, an acquisition request of the Web service use ticket 60 that permits use of the Web service (target ABC) 80 including the above-mentioned authentication ticket and the distinction information that distinguishes the Web service that the Web service (target ABC) 80 to be used requests (ABC in the example of FIG. 31) and transmits the same to the authentication service 30 (sequence SQ52 of FIG. 31).

Here, it is assumed that the client 3 has inquired to the Web service (target ABC) 80, for example in advance and has acquired already that the distinction information for distinguishing the Web service that the Web service (target ABC) 80 requests is ABC.

The authentication service 30 determines, on the basis of the authentication ticket ID contained in the Web service use ticket acquisition request, whether or not there exists a valid corresponding authentication ticket 50, and when it is determine that there exists a corresponding valid authentication ticket 50, creates a Web service use ticket 60 including the distinction information (ABC in the example of FIG. 31) that distinguishes the Web service contained in the above-mentioned Web service use ticket acquisition request. Further, the authentication service 30 creates the Web service use ticket acquisition response including the ID of the Web service use ticket 60 (Web service use ticket ID) and transmit the same to the client 3 (sequence SQ53 of FIG. 31).

Upon reception of the Web service use ticket acquisition response, the client 3 creates the use request of the service that the Web service (target ABC) 80 provides including the Web service use ticket ID, and transmits the same to the Web service (target ABC) 80 (sequence SQ54 of FIG. 31).

Here, it should be noted that the client 3 may transmit the session start request to the Web service as explained in embodiment 1 and transmit the service use request including the session ID, and the like, to the Web service, after the session with the Web service has been established. However, as shown in FIG. 31, it is possible to transmit the use request of the service including a direct Web service use ticket ID to the Web service without establishing the session. The same applies also in the description hereinafter. Also, this applies to the embodiment 1.

The Web service (target ABC) 80 creates a decoding request of the Web service use ticket 60 including the Web service use ticket ID and the distinction information that distinguishes the Web service (target ABC) 80 (ABC in the example of FIG. 31) on the basis of the Web service use ticket ID included in the use request of the service, and transmits the same to the authentication service 30 (sequence SQ55 of FIG. 31).

When it is determined that there exists a valid Web service use ticket 60 corresponding to the Web service use ticket ID included in the decoding request of the Web service use ticket 60, and that the distinction information included in the Web service use ticket 60 (ABC in the example of FIG. 31) and the distinction information (ABC in the example of FIG. 31) that distinguishes the Web service (target ABC) 80 contained in the decoding request of the Web service use ticket 60 are the same, the authentication service 30 creates a Web service use ticket decoding response including the determination result (O.K. in the example of FIG. 31) and the contents of authentication ticket 50 and/or the contents of the Web service use ticket 60, and the like, and transmits the same to the Web service (target ABC) 80 (sequence SQ56 of FIG. 31).

The Web service (target ABC) 80 executes, on the basis of the determination result (O.K. in the example of FIG. 31) contained in the Web service use ticket decoding response the processing corresponding to the use request of the service that has been received in the sequence SQ54, creates a service use response, and transmits the same to the client 3 (Sequence SQ57 of FIG. 31).

Here, the processing for the case in which the Web service (target ABC) 80 is a malicious Web service and has attempted to use a service provided by a Web service 90 distinguished by the target DEF (hereinafter designated also as Web service (target DEF) 90) by using the Web service use ticket ID that permits the use of the Web service (target ABC) 80 included in the user request of the service received in the sequence SQ54 will be explained by using the sequence SQ58 through SQ61.

The Web service (target ABC) 80 transmits a use request for the service that the Web service (target DEF) 90 provides, which includes the Web service use ticket ID included in the use request of the service received in the sequence SQ54, to the Web service (target DEF) 90 (sequence SQ58 of FIG. 31).

The Web service (target DEF) 90 creates a decoding request of the Web service use ticket 60 including the Web service use ticket ID and the distinction information that distinguishes the Web service (target DEF) 90 (DEF in the example of FIG. 31) on the basis of the Web service use ticket ID that is included in the use request of the service, and transmits the same to the authentication service 30 (sequence SQ59 of FIG. 31).

When it is determined that although there exists a valid Web service use ticket 60 corresponding to the Web service use ticket ID included in the decoding request of the Web service use ticket 60 but the distinction information included in that Web service use ticket 60 (ABC in the example of FIG. 31) and the distinction information included in the decoding request of the Web service use ticket 60 and distinguishes the Web service (target DEF) 90 included in the Web service use ticket 60 are different, the authentication service 30 creates a Web service use ticket decoding response including the determination result (NG in the example of FIG. 31) and transmits the same to the Web service (target DEF) 90 (sequence SQ60 of FIG. 31).

The Web service (target DEF) 90 creates a service use response, on the basis of the determination result included in the Web service use ticket decoding response (NG in the example of FIG. 31), including the error information indicating that the decoding has failed, and transmits the same to the Web service (target ABC) 80 (sequence SQ61 of FIG. 31).

As shown in FIG. 31, the malicious Web service (target ABC) 80 cannot use, in the authentication service providing method and/or the Web service providing method of the present invention, the service that the Web service (target DEF) 90 provides even if it has attempted to do such conduct by using the Web service use ticket ID that permits the use of itself, because of the difference in the target (distinction information). Thus, even when a ticket or a ticket ID, or the like, on the communication route has been stolen, this cannot be used for the use of other Web services.

Also, as mentioned above, it is not necessary to change the setting of the authentication service 30 and the client 3 in the authentication service providing method and/or the Web service providing method regarding the present invention, even in the case a new Web service is added to the system.

It should be noted that the Web service (target ABC) 80 and the Web service (target DEF) 90 shown in FIG. 31 may be implemented in the same Web service providing server 2 or in different Web service providing servers 2.

EMBODIMENT 3

In embodiment 3, explanation will be made for the case in which creation of the Web service use ticket 60 is requested and the services other than the acquired service use the Web service use ticket 60 (or Web service use ticket ID). The embodiment 3 may be focused on the points different from those of the embodiments 1 and 2.

Figure 32:
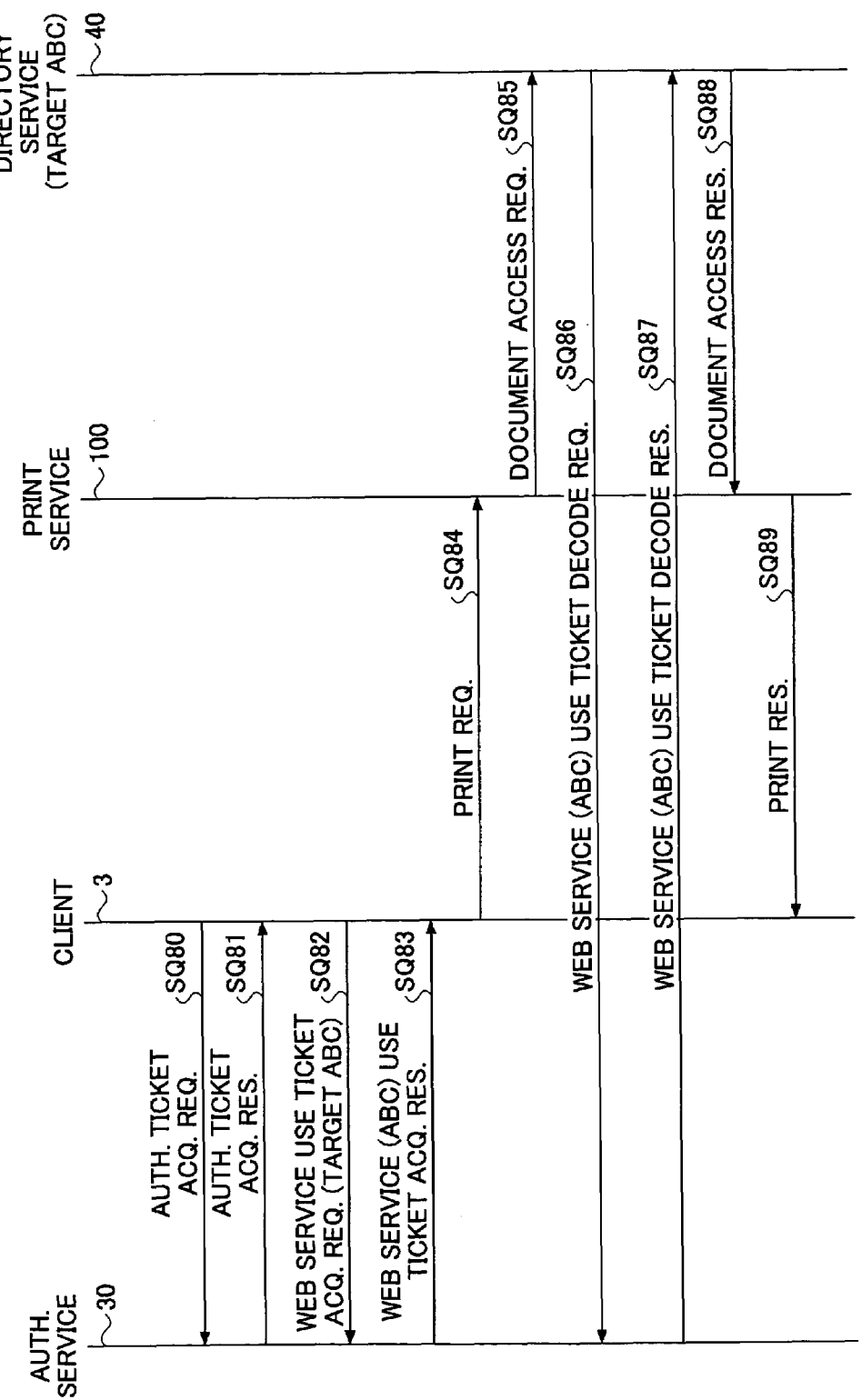
FIG. 32 is a sequence diagram explaining an example of an authentication service providing method and/or Web service providing method for the case another Web service uses the Web service use ticket.

FIG. 32 is a sequence diagram of the authentication service providing method and/or the Web service providing method for the case other Web service uses the Web service use ticket.

As shown in FIG. 32, the client 3 that is going to carry out printing of a document managed in the directory service 40, which is distinguished by the target ABC, creates an acquisition request of the authentication ticket 50 authenticating the user of the client 3 and transmits the same to the authentication service 30 (sequence SQ80 of FIG. 32).

The authentication service 30 carries out authentication based on the user name, password, and the like, included in the authentication ticket acquisition request from the client 3 and crates the authentication ticket 50. Further, the authentication service 30 creates an authentication ticket acquisition response including the ID (authentication ticket ID) of the authentication ticket 50 and transmits the same to the client (sequence SQ81 of FIG. 32).

Upon reception of the authentication ticket acquisition response, the client 3 creates an acquisition request for the directory service 40 including the above-mentioned authentication ticket ID and the distinction information distinguishing the directory service 40 that the directory service 40 for document management requests (ABC in the example of FIG. 32), and transmits the same to the authentication service 30 (sequence SQ82 of FIG. 32).

The authentication service 30 determines, on the basis of the authentication ticket ID contained in the Web service use ticket acquisition request, whether or not there exists a valid authentication ticket 50, and when it is determined that there exists a corresponding valid authentication ticket 50, the authentication service 30 crates a Web service use ticket 60 including the distinction information (ABC in the example of FIG. 32) for distinguishing the Web service included in the Web service use ticket acquisition request. Further, the authentication service 30 creates a Web service use acquisition response including the ID of that Web service use ticket 60 (Web service use ticket ID) and transmits the same to the client 3 (sequence SQ83 of FIG. 32).

Upon reception of the Web service use ticket acquisition response, the client 3 creates a printing request including the above-mentioned Web service use ticket ID and the document distinction information that distinguishes the document to be printed and transmits the same to a printing service 100 that provides the service of printing (Sequence SQ84 of FIG. 32).

Upon reception of the printing request, the printing service 100 creates a document access request that contains the Web service use ticket ID included in the printing request and a document distinction information, and transmits the same to the directory service 40 (sequence SQ85 of FIG. 32).

The directory service 40 creates, when the document access request is received, a decoding request of the Web service use ticket 60 that contains the Web service use ticket ID included in the document access request and the distinction information (ABC in the example of FIG. 32) that distinguishes the directory service 40 and transmits the authentication service 30 (sequence SQ86 of FIG. 32).

The authentication service 30 creates, in the case there exists a valid Web service use ticket 60 corresponding to the Web service use ticket ID included in the decoding request of the Web service use ticket 60 and it is determined that the distinction information included in that Web service use ticket 60 (ABC in the example of FIG. 31) and the distinction information (ABC in the example of FIG. 32) that distinguishes directory service 40 and contained in the decoding request of the Web service use ticket 60 are the same, creates a Web service use ticket decoding response including the determination result (O.K. in the example of FIG. 32), the contents of authentication ticket 50 and/or the contents of Web service use ticket 60, and transmits the same to the directory service 40 (sequence SQ87 of FIG. 32).

The directory service 40 acquires, when the Web service use ticket decoding response is received, the document (or document contents) corresponding to the document distinction information on the basis of the determination result (O.K. in the example of FIG. 32) that is included in that Web service use ticket decoding response and creates a document access response including the document (or document contents). Further, the directory service 40 transmits the same to the printing service 100 (sequence SQ88 of FIG. 32).

The printing service 100 carries out printing, when the document access response is received, on the basis of the document (or document contents) included in the document access response and creates a printing response including the result of the printing and transmits the same to the client 3 (sequence SQ89 of FIG. 32).

As shown in FIG. 32, it is also possible to request creation of the Web service use ticket 60 and the service other than the service acquired use the Web service use ticket 60 (or the Web service use ticket ID).

EMBODIMENT 4

Below, an image formation apparatus that forms an image (hereinafter called integrated machine) will be explained by using FIG. 33 and FIG. 34 as other examples of the apparatus in which the authentication service 30 and/or the directory service 40 is implemented.

Figure 33:
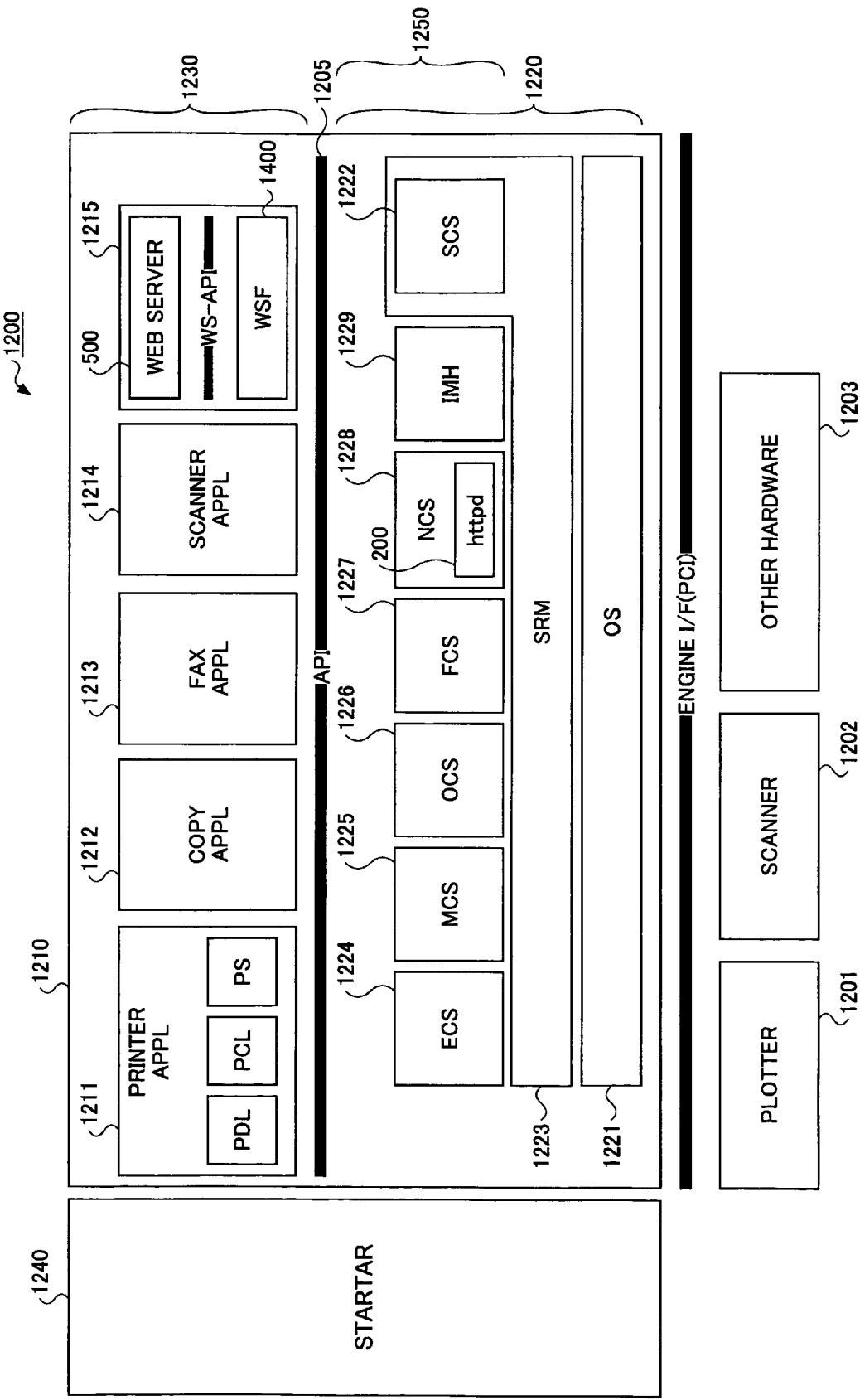
FIG. 33 is a block diagram showing the construction of a integrated machine.

FIG. 33 is a block diagram showing the functional construction of the integrated machine.

In FIG. 33, the integrated machine 1200 includes a plotter 1201, a scanner 1202 and a hardware resource 1203 such as facsimile, and further includes a software group 1210 formed of a platform 1220 and an application 1230, and a integrated machine starter part 1240.

The integrated machine starter part 1240 is first executed at the time of power on of the integrated machine 1200 and activates the platform 1220 and the application 1230.

The platform 1220 includes: a control service shown below that interprets the processing request from the application 1230 and causes to produce the acquisition request of the hardware resources; a system resource manager (SRM (System Resource Manager) 1223) that manages one or plural hardware resources and arbitrates the acquisition requests from the control service 1250; and an OS 1221.

This control service 1250 is formed from plural service modules. More specifically, there are provided an SCS (System Control Service) 1222, an ECS (Engine Control Service) 1224, an MCS (Memory Control Service) 1225, an OCS (Operation panel Control Service) 1226, a FCS (fax Control Service) 1227, an NCS (Network Control Service) 1228, and an IMH (Imaging Memory Handler) 1229. It should be noted that this platform 1220 has an application program interface that enables reception of processing request from the above-mentioned applications by a predefined function.

Here, the OS 1221 is an operating system of UNIX (trade mark), and the like, and carries out each software of the Platform 1220 and the application 1230 as a process by parallel processing.

The SRM 1223 carries out control of the system and managing of the resource together with SCS1222, and achieved arbitration and control of execution according to the requests from the upper layers that use the hardware resources such as engine part that includes scanner, plotter, and the like, memory, HDD files, Host I/Os (Centronix I/F, network I/F, IEEE1394I/F, RS232CI/F, etc.).

The SCS 1222 carries out plural functions such as application control, operation part control, system screen display (job listing screen, counter display screen etc.), LED display, resource control, interrupt application control, and the like.

The ECS 1224 controls the engine part such as the plotter 1201, the scanner 1202, the hardware resources 1203, and the like, and carries out image reading, printing, status notification, jam recovery, and the like.

The MCS 1225 carries out memory control such as acquisition and release of image memory, use of the hard disk apparatus (HDD), compression and decompression of image data, and the like.

The OCS 1226 is a module that controls an operation panel that functions as information transmission means between the operator and a main control, and carries out processing such as notification of key operation event of the operator to the main control, providing of library functions to each application for construction of GUI, management of constructed GUI information for each of the applications, display to the operation panel, and the like.

The FCS1227 provides an API (Application Program Interface) for carrying out facsimile transmission and reception from each application layer of the system controller by using PSTN/ISDN net, registration/quotation of various facsimile data managed by the BKM (backup SRAM), facsimile reading, facsimile reception and printing, and integrated transmission and reception.

The NCS 1228 is a module group that provides a service commonly to the applications that require a network I/O, and carries out processing such as distribution of the data received from the network side by each protocol to each application, or mediation at the time of transmitting data from the application to the side of network, and the like.

Furthermore, it is possible to construct such that the NCS 1228 controls the data communications to the network devices connected through the Internet by httpd (Hypertext Transfer Protocol Daemon) 200, which is one of plural protocols, according to HTTP (Hypertext Transfer Protocol), activate the processing part corresponding to the Web service designated by the HTTP request header by function call, and notify the processing result by the Web service to the network device with an HTTP response. For example, the Web service is provided in accordance with the message described by XML (extensible Markup Language).

The IMH 1229 maps the image data to the physical memory from the virtual memory region (user virtual space). Upon activation of the process, it carries out the system call and maps the virtual memory region for the process or releases the virtual memory region thus mapped at the end of the process.

The application 1230 includes a printer application 1211, which is the application for a printer and including page description language (PDL), PCL and also postscript (PS), a copy application 1212, which is an application for copying, a facsimile application 1213, which is an application for facsimile, a scanner application 1214, which is an application for scanner, and a Web service processing application 1215, which is a Web service application. Also, it is possible to install a new application via the network connected by the NCS 1228. Also, each of the applications can be added or deleted individually.

The Web service processing application 1215 includes a Web server 500 that receives the HTTP request requesting a Web service and provide the Web service by transmitting an HTTP response, and a Web service function (WSF) 1400, wherein the WSF 1400 carries out a predetermined processing by utilizing the control service 1250 through API (Application Program Interface) and provides the processing result through the WS-API (Web Service Application Program Interface) as the Web service.

In the present embodiment, the authentication service 30 and/or directory service 40 are implemented to the Web service function 1400.

Also, the authentication ticket 50, the user information, the group information, the Web service use ticket 60 and/or the session 70, and the like, are held in the HDD 1303 to be described later.

Figure 34:
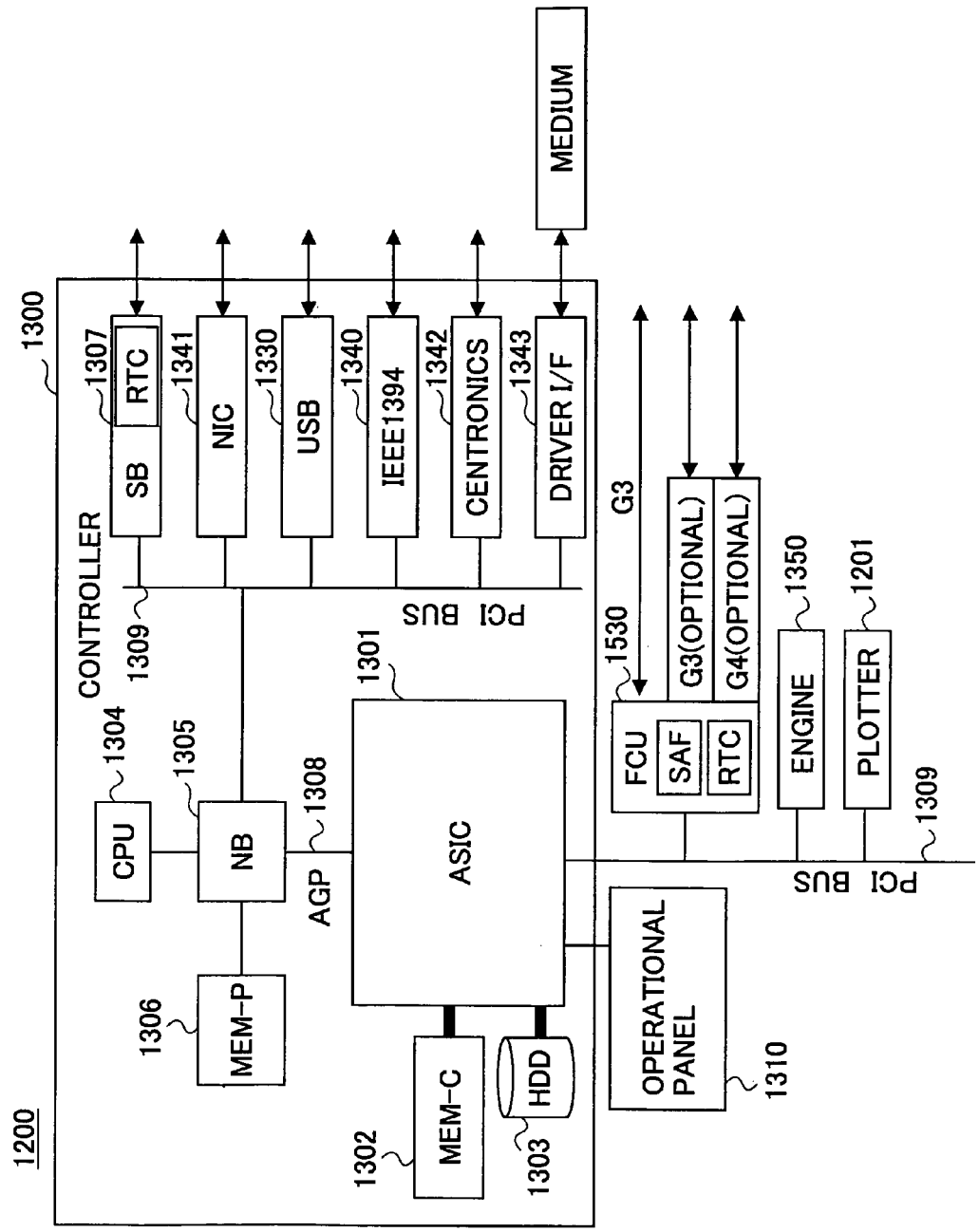
FIG. 34 is a block diagram showing the hardware construction of the integrated machine.

FIG. 34 is a block diagram showing the hardware construction of an integrated machine 1200.

As shown in FIG. 34, the integrated machine 1200 has a construction in which an operation panel 1310, a fax control unit (FCU) 1530, an engine part 1350 (the scanner 1202, or the like, is connected), and an ASIC 1301 of the plotter 1201 and the controller 1300 are connected by a PCI (Peripheral Component Interconnect) bus 1309, and the like.

The controller 1300 connects the MEM-C 1302, the HDD (Hard Disk Drive) 1303, and the like, to the ASIC1301 and further connects this ASIC 1301 to a CPU 1304 via an NB 1305, which is a CPU chip set.

Here, it should be noted that the ASIC 1301 and the NB 1305 are connected not via the PCI but via an AGP 1308.

The CPU1304 carries out overall control of the integrated machine 1200. More specifically, it activates the SCS 1222, the SRM 1223, the ECS 1224, the MCS 1225, the OCS 1226, the FCS1227, and the NCS 1228 that form a platform 1220 on the OS 1221 as a process and causes them to execute the respective processes. Further, it activates the printer application 1211, the copy application 1212, the fax application 1213, the scanner application 1214, and the Web service processing application 1215, which constitute the application 1230 as the process and causes them to execute the respective processes.

The NB 1305 is a bridge for connecting the CPU 1304 to an MEMP 1306, an SB 1307, an NIC (Network Interface Card) 1341, a USB (Universal Serial Bus) 1330, an IEEE1394 1340, a Centronix 1342, a driver I/F 1343, and ASIC 1301.

Here, it should be noted that MEMP1306 is a system memory used as an image memory of an integrated machine, while the SB 1307 is a bridge that connects the NB 1305 to the ROMPCI device and the peripheral device. It should be noted that the MEM-C1302 is a local memory used for a copy image buffer and code buffer while ASIC 1301 is an IC for image processing application that has a hardware element for image processing.

The driver I/F1343 is an I/F (interface) used for reading the program or application from an inserted recording medium that stores the program or application and install the same to the integrated machine 1200. Here, the recording medium includes SD memory card, smart media, multimedia card, CompactFlash (trade mark), and the like.

The HDD 1303 is a storage that accumulates image data, programs, font data, forms, and documents. Further, the HDD 1303 holds the authentication ticket 50, user information, group information, Web service use ticket 60, and/or the session 70, and the like, of the present embodiment.

Here, it should be noted that the operational panel 1310 is an operation part for accepting input operation of the operator and for providing display to the operator.

The ASIC 1301 is provided with a RAM interface for connecting the MEM-C1302 and further a hard disk interface for connecting the HDD1303. In the case of conducting input or output of image data to and from these memory parts, the source of input or destination of output is switched to the RAM interface or the hard disk interface.

The AGP 1308 is a bus interface of graphics accelerator card proposed for speeding up the graphic processing. Thus, the AGP 1308 speeds up the graphics accelerator card by accessing to the system memory directly with high throughput.

Further, the present invention is by no means limited to the embodiments described heretofore, but various variations and modifications may be made without departing from the scope of the invention.

The present invention is based on the Japanese Priority Patent Applications No.2003-162592 and No.2003-162593 both filed on Jun. 6, 2003 and Japanese Priority Patent Applications No.2004-162239 and 2004-162240 both filed on May 31, 2004, the entire contents of which are incorporated herein as reference.

What is claimed is:

1. A Web service providing method of a Web service provider providing a Web service, comprising:
   a receiving step for receiving a request for Web services from a client;
   a decoding request transmission step transmitting, in response to the request from the client, a decoding request of Web service use permission information related to permission of use of said Web service, to an authentication service provider that provides a service related to authentication, the decoding request transmission step occurring before a response to the request for web services is transmitted to the client; and
   a decode response reception step, receiving a decode response of said Web service use permission information issued in response to said decoding request of said Web service use permission information, from said authentication service provider, the decoding response reception step occurring before a response to the request for web services is transmitted to the client.

2. The Web service providing method as claimed in claim 1, wherein said decoding request of said Web service use permission information includes said Web service use permission information and Web service distinction information that distinguishes said Web service provider.

3. The Web service providing method as claimed in claim 1, further comprising a session creation step that creates a session in response to a decoding result contained in said decoding response.

4. The Web service providing method as claimed in claim 3, further comprising a session transmission step that transmits session distinction information distinguishing said session, to said client as said session.

5. The Web service providing method as claimed in claim 3, further comprising use request reception step that receives a use request of said Web service including information regarding said session from said client.

6. The Web service providing method as claimed in claim 5, further comprising a validity determination step that determines the validity of said information regarding said session included in said use request.

7. The Web service providing method of as claimed in claim 1, further comprising an information acquisition request reception step, said information acquisition request reception step receives an acquisition request for Web service distinction information that distinguishes information from said client regarding said authentication service providing means and/or said Web service provider.

8. The Web service providing method as claimed in claim 7, further comprising an information acquisition response transmission step acquiring, in response to said information acquisition request, corresponding information from a storage device holding information regarding the said authentication service provider and/or Web service distinction information that distinguishes said Web service provider, information acquisition response transmission step transmitting said corresponding information to said client.

9. A processor-readable medium having stored thereon a program code for causing a computer to provide a Web service, said program code comprising:
   a receiving step for receiving a request for Web services from a client;
   a decode request transmission program step transmitting, in response to the request from the client, a decoding request for Web service use permission information related to permission of use of said Web service, to an authentication service provider that provides a service related to authentication, the decoding request transmission step occurring before a response to the request for web services is transmitted to the client; and
   a decode response reception program step receiving a decode response of said Web service use permission information in response to said decoding request of said Web service use permission information from said authentication service provider, the decoding response reception step occurring before a response to the request for web services is transmitted to the client.

10. The processor-readable medium as claimed in claim 9, wherein said decoding request of said Web service use permission information includes Web service use permission information and Web service distinction information that distinguishes a Web service provider provided by said computer.

11. The processor-readable medium as claimed in claim 9, further comprising a session creation program step creating a session in response to a decoding result included in said decoding response.

12. The processor-readable medium as claimed in claim 11, further comprising a session transmission program step transmitting session distinction information distinguishing said session to said client as said session.

13. The processor-readable medium as claimed in claim 11, further comprising a use request reception program step receiving a use request of said Web service including information related to said session from said client.

14. The processor-readable medium as claimed in claim 13, further comprising a validity determination program step determining a validity of said information related to said session and included in said use request.

15. The processor readable medium as claimed in claim 9, further comprising an information acquisition request receiving program step receiving an acquisition request of information related to said authentication service provider and/or Web service distinction information distinguishing said Web service provider from said client.

16. The processor-readable medium as claimed in claim 15, further comprising an information acquisition response transmission program step acquiring, in response to said acquisition request of information, said corresponding information from a storage that stores information related to said authentication service provider and/or Web service distinction information distinguishing said Web service provider and transmitting the same to said client.

17. A Web service providing apparatus including a Web service provider providing a Web service, said Web service provider comprising:
   a receiver configured to receive a request for Web services from a client;
   a decode request transmitter configured to transmit, in response to the request from the client, a decode request of Web service use permission information related to permission of user of said Web service to an authentication service provider that provides an authentication service, the decoding request transmission step occurring before a response to the request for web services is transmitted to the client; and
   a decode response receiver configured to receive a decode response of said web service use permission information in response to said decode request of said Web service use permission information from said authentication service provider, the decoding response reception step occurring before a response to the request for web services is transmitted to the client.

* * * * *